United States Patent [19]

Sims et al.

[11] Patent Number: 5,434,775
[45] Date of Patent: Jul. 18, 1995

[54] MANAGING AN INVENTORY OF DEVICES

[75] Inventors: Nathaniel M. Sims, Wellesley Hills, Mass.; John M. Turner, Lake Forest, Ill.; Jane M. Zeisloft, Barrington, Ill.; Daniel C. Kusswurm, Geneva, Ill.; Ralph H. LaBedz, McHenry, Ill.

[73] Assignees: The General Hospital Corporation, Charlestown, Mass.; Baxter International Inc., Deerfield, Ill.

[21] Appl. No.: 146,929

[22] Filed: Nov. 4, 1993

[51] Int. Cl.⁶ .......................................... G06F 153/00
[52] U.S. Cl. .................................................. 364/403
[58] Field of Search ................. 364/403; 235/441, 486

[56] References Cited

U.S. PATENT DOCUMENTS 4,578,573  3/1986  Flies et al. .
5,220,501  6/1993  Lawlor et al. .
5,319,363  6/1994  Welch et al. .

OTHER PUBLICATIONS

Dallas Semiconductor, "Touch Memory Products", Technical Bulletin #1, May 14, 1992.
Dallas Semiconductor, "DS225(T), 128K Micro Stik", pp. 45–64.
Datakey, "Model DK1000, DK2000 & DK4000 Serial Memory Keys", 1990.
Dallas Semiconductor, "Touch Memory at the Bedside", 1992.
Dallas Semiconductor, "DS9092K Touch Memory Starter Kit" User's Manual, Aug. 1991.
Dallas Semiconductor, "Touch the Future".
Dallas Semiconductor, *1992–1993 Product Data Book*, "DS1992/DS1993/DS1994", pp. 12–35 through 12–25.
Dallas Semiconductor, "50 Ways to Touch Memory", Oct. 1992.
Dallas Semiconductor, *Book of DS199X Touch Memory Standards*, "Touch Memory TM Overview", pp. 1–9, Oct. 1992.
Dallas Semiconductor, *Book of DS199X Touch Memory Standards*, "Product Overview", pp. 11–17, Oct. 1992.
Dallas Semiconductor, *Book of DS199X Touch Memory Standards*, "Logical Standarts and Characteristics", pp. 39–51, Oct. 1992.
Dallas Semiconductor, *1991 Automatic Identification Data Book*, "Automatic I.D.", pp. iii–xvi, 1991.
Dallas Semiconductor, *1991 Automatic Identification Data Book*, "Communicating with Touch Memories", pp. 63–65, 1991.
Dallas Semiconductor, *1991 Automatic Identification Data Book*, "Touch Serial Number" pp. 66–74, 1991.
Dallas Semiconductor, *1991 Automatic Identification Data Book*, "DS1992 Touch Memory", pp. 104–105, 1991.
Dallas Semiconductor, *1991 Automatic Identification Data Book*, "DS9092 Touch Memory Probe", pp. 110–112, 1991.
Dallas Semiconductor, *1991 Automatic Identification Data Book*, "DS9093 Touch Memory KeyRing Mount", p. 114, 1991.

(List continued on next page.)

Primary Examiner—Donald E. McElheny, Jr.
Attorney, Agent, or Firm—Fish & Richardson

[57] ABSTRACT

The locations of a plurality of devices are tracked using a network of communication links, each of which corresponds to a location. Each device is given a tag that identifies the device with respect to other devices and that is connectable to a communication link when the device is disposed at the location to which the link corresponds. Each tag that is connected to each communication link is detected, and the location of each device is determined based on the detection. One feature of the technique is additionally determining the conditions of the devices by correlating one or more communication links with conditions. The technique is simple to use and highly effective technique in tracking devices stored at various locations throughout a facility. Device location and condition are monitored continuously, thereby reducing the risk that the removal of a device from storage will go undetected.

102 Claims, 15 Drawing Sheets

OTHER PUBLICATIONS

Dallas Semiconductor, *1991 Automatic Identification Data Book*, "DS9094 Touch Memory Clip", p. 115, 1991.

Wescom, "Patient Focused Care . . . The Heart of our System".

Istantel, *WatchMate System*, "The Next Generation in Complete, Caring Wander Protection".

*WanderGuard For Wanderers*, "The Prudent Affordable Warning System-Reduces Concern and Worry".

Wandalert, "Electronic Exit Control and Monitoring Systems".

Sekurmed, "Wandering Patient Monitoring System", 1992.

Sekurmed, "Infant Monitoring System", 1991.

*Facilities Operation & Management*, "Anti-Shoplifting Technology Comes to the Nursery", Oct. 14, 1991.

*Phone Vision*, "Staff Finder & Equipment Locator".

Infra-Com, "A Staff and Equipment Locating and Signaling System from United Identification Systems Corp.", 1989.

Lifesaver, "How to Run a Floor Without Having to Run Around it", 1991.

*ServiceMaster*, "For Your Clinical Equipment Management-Rely on Servcure TM, the ServiceMaster Solution", 1989.

*Memory Card System and Design*, "Selecting a Data Carrier", Nov.-Dec. 1991.

Teresa Riordan, *The New York Times*, "A Small Company Gets a Big Patent Covering Financial Transactions From Home Computers", Aug. 9, 1993.

*Automatic I.D. News for Automated Data Capture System Management*, "New Products", vol. 8, No. 10, Oct. 1992.

|   | DATA STRUCTURE 36 | PORT ID | EVENT DATE/ TIME STAMP | EVENT TYPE |
|---|---|---|---|---|
|   | 98–D100 | 108⌒001 | 104⌒12/1/93 12:00 | C⌒106 |
|   | 98–D200 | 001 | 12/1/93 12:00 | C |
|   | 98–D150 | 002 | 12/1/93 12:00 | C |
|   | 98–D500 | 003 | 12/1/93 12:00 | C |

100↖

HEADER 122 | 120 | DATA 124

| OTHER HEADER INFO | NODE ADDRESS | TAG ADDRESS | PORT ID | DATE/ TIME | EVENT TYPE |
|---|---|---|---|---|---|
| 126 | 128 | 130 | 132 | 134 | 136 |

ACTIVITY FILE 140

| EVENT DATE/ TIME STAMP | TAG ADDRESS 38 | EVENT TYPE | LOCATION CODE | CONDITION CODE |
|---|---|---|---|---|
| 146—12/1/93 12:00⌐145,104 | D100 | C | 142—100 | C—144 |
| 146—12/1/93 12:00 | D200 | C | 100 | C |
| 12/1/93 12:00 | D150 | C | 100 | D |
| 12/1/93 12:00 | D500 | C | 100 | R |
| 147—12/1/93 13:00 | D50 | C | 210 | C* |
| 148—12/2/93 14:20 | D300 | C | 210 | C* |
| 149—12/2/93 18:07 | D75 | C | 210 | C* |
| 150—12/3/93 11:50 | D50 | D | 210 | C* |

| TAG ADDRESS 38 | LOCATION CODE | CONDITION CODE | DATE/TIME STAMP | EVENT TYPE | DEVICE TYPE | OTHER INFORMATION ABOUT THE DEVICE |
|---|---|---|---|---|---|---|
| 172~D50 | 174~210 | 176~C* | 12/3/93 11:50 | 178~D 180 | PUMP200 182 | ...~184 |
| D75 | 210~142 | C* | 12/2/93 18:07 | C | SIGNSMON | ... |
| D100 | 100 144 | C | 12/1/93 12:00 | C | PUMP100 | ... |
| D150 | 100 | D | 12/1/93 12:00 | C | ACTHIGH | ... |
| D200 | 100 | C | 12/1/93 12:00 | C | PRTMON | ... |
| D300 | 210 | C* | 12/2/93 14:20 | C | ACKNEE | ... |
| D500 | 100 | R | 12/1/93 12:00 ~104 | C | SIGNSMON | ... |
| . | . | . | . | . | . | |
| . | . | . | . | . | . | |

INVENTORY DATABASE 170

FIG. 10

HOSPITAL LOCATION
DATABASE 191

| LOCATION CODE 142 | FULL NAME OF LOCATION |
|---|---|
| . | . |
| . | . |
| 100 | WHITE BUILDING, 10th FLOOR |
| . | . |
| . | . |
| . | . |
| 210 | SMITH BUILDING, ROOM 2302 |
| . | . |

FIG. 11

CONDITION
DATABASE 192

| CONDITION CODE 144 | TEXT OF CONDITION |
|---|---|
| C | READY |
| R | NEEDS REPAIR |
| D | NEEDS CLEANING |

FIG. 12

EVENT TYPE
DATABASE 193

| TYPE | EVENT |
|---|---|
| C | CONNECT |
| D | DISCONNECT |

FIG. 13

PAR LEVEL
DATABASE 194

| LOCATION CODE 142 | DEVICE TYPE | PAR LEVEL | OPTIMUM |
|---|---|---|---|
| 195—100 | SIGNSMON | 2 | 6 |
| 100 | PUMP100 | 1 | 4 |
| 100 | ACTHIGH | 0 | 2 |
| . | . | . | . |
| . | . | . | . |
| . | . | . | . |

DEVICE DATABASE 196

| DEVICE TYPE | DEVICE DESCRIPTION |
|---|---|
| ACKNEE | AIR COMPRESSOR-KNEE SLEEVE |
| ACTHIGH | AIR COMPRESSOR-THIGH SLEEVE |
| PUMP100 | IV PUMP-SERIES 100 |
| PUMP200 | IV PUMP-SERIES 200 |
| SIGNSMON | VITAL SIGNS MONITOR |
| PRTMON | PORTABLE MONITOR |
| BOOT | AIR BOOT |
| . | . |
| . | . |

FIG. 16

FLOOR INVENTORY DATABASE 200

| LOCATION CODE | DEVICE TYPE | NUMBER CLEAN | PAR OPTIMUM | NUMBER NEED CLEANING | NUMBER NEED REPAIR | MESSAGE |
|---|---|---|---|---|---|---|
| 202 → 100 | BOOT | 0 | 1 | 2 | 0 | |
| 100 | SIGNSMON | 0 | 2 | 6 | 1 | "WARNING" 204 |
| 100 | PUMP100 | 1 | 1 | 4 | 0 | "WARNING" |
| 100 | PRTMON | 1 | 0 | 1 | 0 | 206 |
| 100 | ACTHIGH | 0 | 0 | 2 | 0 | |
| . | . | . | . | . | . | |
| . | . | . | . | . | . | |

REQUEST DATABASE 250

| DATE/TIME STAMP | REQ. TYPE | PERSON ID | DEVICE TYPE | PAGER ID | REPORT TYPE | PRIORITY | SEND TO | MISC. |
|---|---|---|---|---|---|---|---|---|
| 254 | 256 | 258 | 260 | 262 | 264 | 266 | 268 | 270 |
| 252—12/15/93 1:20 | REPORT | 820 | BOOT | P18 | FLOOR | — | PRINTER 05 | LOCATION |
| 252—12/15/93 10:30 | DEVICE | — | — | — | — | 2 HR | — | LOCATION |
| 252—12/15/93 10:40 | PERSONNEL | 1025 | — | P21 | STAT | STAT | — | — |
| . | . | . | . | . | . | . | . | . |

FIG. 18

PAPER DATABASE 280

| PERSON ID | FULL DESCRIPTION OF PERSON | PAGER ID | PAGER NUMBER |
|---|---|---|---|
| 258 | | 262 | 226 |
| 820 | FRANK JOHNSON | P18 | 555-1010 |
| 1025 | JANE HALL | P21 | 555-7600 |
| . | . | . | . |

FIG. 19

WHITE BUILDING 10th FLOOR—292

| DEVICE TYPE | READY | PAR | OPTIMUM | NEEDS CLEANING | NEEDS REPAIR |
|---|---|---|---|---|---|
| 294 → AIR BOOT | 0 | 1 | 2 | 0 | 0 |
| WARNING VITAL SIGNS MONITOR | 0 | 2 | 6 | 0 | 1 |
| 296 IV PUMP SERIES 100 | 1 | 1 | 4 | 0 | 0 |
| PORTABLE MONITOR | 1 | 0 | 1 | 0 | 0 |

FLOOR REPORT 290

FIG. 20

MANAGING AN INVENTORY OF DEVICES

BACKGROUND OF THE INVENTION

This invention relates to managing an inventory of portable devices, and more particularly to tracking the locations of devices that are stored in various areas (such as rooms) throughout a facility and determining the conditions of the devices.

Portable devices are used by many different types of facilities. Hospitals, for example, use large numbers of portable patient care devices (such as pacemakers, vital signs monitors, and fluid infusion pumps). When the devices are not in use, they are typically placed in one of numerous storage areas (e.g., storerooms) distributed throughout the hospital until they are needed again. Hospital personnel should be able to rapidly determine where the devices are stored, as well as the number of devices that are available for use, both to ensure adequate patient care and to efficiently manage the inventory of devices.

One way of monitoring the locations of the stored devices is to track the devices manually as they are placed in, and later removed from, the storage areas. The conditions of the devices (e.g., ready for use, repair needed, cleaning required, etc.) are indicated by affixing tag to them that have a characteristic (such as color) indicative of the condition, and making a like entry in the manual tracking system.

The typical manual inventory management schemes rely on personnel to deliver and retrieve devices broadly distributed throughout the building. Lack of a mechanism to locate the devices in use or in temporary storage requires hard-to-implement policies that result in room-to-room searches to locate the devices. As a result, inventories of the devices often are expanded to meet the needs of the facility, and users may resort to hording the devices to assure their availability.

Some manufacturing facilities track locations of portable equipment on a factory floor by placing transmitters (e.g., infrared emitters or RF tags) on the devices, and positioning receivers at several locations around the floor. The signal sent by each transmitter includes a unique code that identifies the device, and the position of the device is determined based on characteristics (e.g., strength or phase) of that signal as received by one or more receivers.

SUMMARY OF THE INVENTION

This invention provides an efficient, simple to use and highly effective technique for tracking devices stored at various locations throughout a facility. Device location (and, if desired, condition) is monitored continuously, thereby reducing the risk that the removal of a device from storage (and placement of the device in another location) will go undetected.

In one general aspect of this concept, a network of communication links each of which corresponds to a location is provided, and each device is given a tag that identifies the device with respect to other devices and that is connectable to a communication link when the device is disposed at the location to which the link corresponds; each tag that is connected to each communication link is detected, and the location of each device is determined based on the detection.

Preferred embodiments include the following features.

Each one of at least some communication links also correspond to device conditions (such as "ready for use," "in need of cleaning," and "in need of repair"). Each tag that is connected to those communication links is detected, and the conditions of the devices identified by the tags are determined based on the detection. At least two of such communication links are assigned to a single location.

Data that includes an address is stored in a memory of each tag that identifies the device with which the tag is associated. The data is read as part of determining the location of the device. The memory may also store information (e.g., maintenance information) associated with the device. This information can be written to the memory from other equipment (such as a computer) on the network, or from the device itself.

Multiple tags may be (and preferably are) connected to a link for detection. All devices that are disposed in the location to which the link corresponds are identified by reading the stored data of the multiple tags on the link.

A tag is connected to its device so that a user can place the device near a link at one of the locations and connect the tag to the link. In one embodiment, the tag is tethered to the device by a cord; in another embodiment, the tag is mounted directly to the device.

The tags are detected by monitoring each of the communication links for activity thereon by one or more of the tags. Activity includes a user connecting a tag to a link (a "connection event") or disconnecting a tag from a link (a "disconnection event"). The link is monitored in successive cycles; a connection event or a disconnection event is determined to be valid only if the event is detected in a selected number of successive cycles. Moreover, a connection event is determined to be valid only if the associated tag remains connected for a selected amount of time; likewise, disconnection events are valid only if the associated tag remains disconnected for a selected amount of time.

Monitoring is performed continuously for each link. This allows for essentially immediate detection of connection and disconnection events, thereby greatly enhancing the accuracy with which devices are tracked. Moreover, continuous monitoring allows the location of a device whose tag is connected to the network to be known at all times. This is in stark contrast to tracking schemes that use bar code readers or the like, which monitor device location only at the moment that the reader senses the bar code and thus rely on the user to employ the bar code reader each time the device is moved, and thus are highly reliant on the diligence of the users to accurately track device location.

Moreover, the continuous monitoring allows the system to recover rapidly from environmental failures such as power outages. Upon power-up, all tags connected to network communication links are quickly reread—without the need for user intervention. Accordingly, information as to the locations and conditions of the devices is rapidly recovered. As a result, the invention is more fault tolerant than schemes (such as bar code reader approaches) that rely on users to manually scan the devices to record their locations.

One or more nodes are provided on the network, each for serving a set of communications links. Each node detects the tag or tags connected to its set of communication links, and the locations (and conditions) of the devices identified by the tags are determined based on this detection. It is particularly useful in this system configuration to assign at least some of the set of communication links of each node to a single location (such as a storeroom). Each such communication link is further assigned to a device condition. One or more of the links can be assigned to the same condition. Among other advantages, this allows the devices to be tracked at a high level of granularity (e.g., location plus condition), thereby providing another level of information for inventory control. Moreover, the use of nodes allows the device monitoring capacity of a storage area (such as a materials management department) to be increased as necessary, simply by adding nodes and communication links to the network and assigning them to the storage area.

The communication links can be assigned to as many or few rooms in the hospital as desired. One possibility is providing a network communication link for each of the various hospital storerooms. Because the vast majority of the device inventory is placed in a storeroom at regular intervals, monitoring devices in the storerooms provides accurate inventory management (i.e., without the need to monitor every room in the hospital—although this certainly may be done, if desired).

A stored database contains information that relates each device to its determined location and condition. Reports of the locations and conditions of one or more selected devices are generated using the database information. Reports are transmitted over a branch of the network for use by other equipment that communicate on the network. Examples of this equipment include computers for displaying the reports, printers for printing the reports, and facsimile equipment for faxing reports to selected destinations.

Network computers can also send messages that contain at least some of the information in the reports to a user. This may be done by telephone or by pager.

Device inventory can be managed in numerous ways according to the invention. For example, the database information is used to determine the quantities of selected types of devices that are stored in selected locations. A user is notified if the quantity of a selected type of device falls below a threshold (called a par level), or if a quantity of a selected type of device exceeds a threshold, or if a particular device is detected on the network.

Users access the database to obtain information about the location and condition of a selected one or more of said devices. In one embodiment, access is provided by telephone.

A variety of techniques are provided for allowing multiple tags to be connected to a communication link. In one approach, the link includes a connector that allows multiple tags to be connected to it; in another, a series of connectors—each for receiving a single tag—are associated with the communication link.

In one embodiment, at least one of the device locations includes a shelf having at least one opening therein, and at least one communication link is electrically coupled to an electrically conductive member (e.g., a metal sheet) disposed below the opening. At least one of the devices is equipped with a spring-loaded plunger which is urged through the opening and into engagement with the sheet when the device is placed on the shelf to electrically connect the tag of the device to the communication link. Among other advantages, this feature combines the steps of placing the device on the shelf and connecting the tag to the network, thereby further ensuring accurate tracking.

The plunger is configured to retract when the device is placed on a solid surface (thereby not interfering with the normal use of the device). The communication link includes two wires, one connected to the sheet, the other connected to the shelf. An electrically conductive footing is provided on the device to connect the tag to the shelf (and hence to the second wire).

The invention drastically reduces the burden of tracking and managing large inventories of devices compared with manual schemes and techniques which use bar code or other readers to register the movement of devices from one location to another. The tags are convenient to use, requiring only that the user perform a simple action to connect a tag to a communication link (for example, the user slides the tag into a connector on the link). Disconnection is equally simple—the user merely pulls the tag out of the connector. As a result, the tracking system is highly user-friendly, thereby leading to a high rate of compliance by device users and thus highly accurate device tracking.

Moreover, the ease with which the tags are connected to and disconnected from the links greatly reduces the risk of error compared with bar code readers and the like, which require that the user carefully pass the reader over the code for accurate reading. This feature also enhances the reliability and accuracy of the tracking system of the invention.

The tags are also rugged (e.g., they contain no moving parts, crystal oscillators, or the like) and, in preferred embodiments, do not require their own power supply (e.g., a battery) to operate. Thus, the tags can reliably operate for long periods of time in a hospital environment without failing. Besides being easier to use, the tags are also relatively inexpensive compared with equipment used in other tracking techniques (such as infrared and RF locating schemes, and bar-code reading approaches).

Other features and advantages of the invention will become apparent from the following detailed description, and from the claims.

BRIEF DESCRIPTION OF THE DRAWING

FIGS. 10–16, 18, and 19 show databases maintained by a data management computer on the network.

FIG. 20 is a floor inventory report.

DESCRIPTION OF THE PREFERRED EMBODIMENTS

Figure 1:
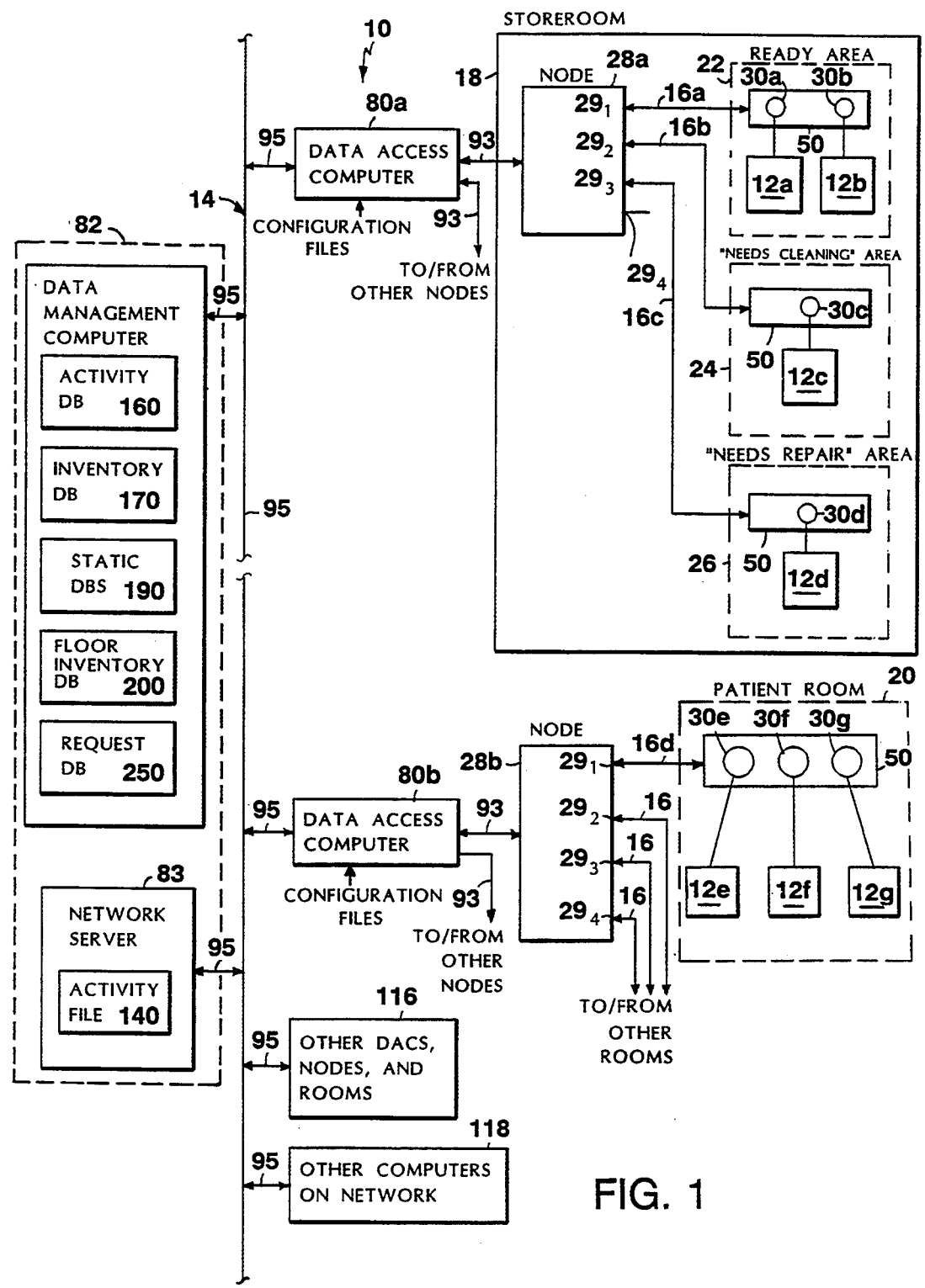
FIG. 1 is a functional block diagram of a system for tracking the locations and conditions of devices connected on a network of communication links.

Referring to FIG. 1, a system 10 is shown for managing an inventory of multiple portable devices 12a–12g (designated generally as 12) in a hospital by determining the locations and conditions of devices 12 on a network 14 of communication links, designated generally as 16, in a manner to be described.

Each communication link 16 corresponds to a location in the hospital. For example, communication links 16a, 16b, 16c are assigned to a storeroom 18, while communication link 16d corresponds to a patient room 20. Some communication links (such as links 16a, 16b, and 16c) also correspond to various conditions of devices 12 stored in room 18. For example, communication link 16a is associated with a storeroom area 22 in which devices 12 that are ready for use are placed. Devices to be cleaned or repaired are disposed in other storeroom areas 24, 26, each of which is assigned a communication link 16b, 16c. Areas 24, 26, 28 are, for example, different shelves or sets of shelves in storeroom 18. Simply put, one or more communication links 16 are assigned to every room or other area in the hospital at which devices 12 are likely to be stored or used to allow system 10 to track the locations and/or the conditions of the hospital's entire inventory of portable devices 12, as explained in detail below.

Network 14 also includes a set of nodes 28a, 28b (designated generally as 28) which serve as interfaces for communications links 16. Some nodes, such as node 28a, are associated with a single location (e.g., storeroom 18), while other nodes (for example, node 28b) serve multiple locations (such as patient room 20 and other rooms). Each node 28 includes a set of four ports $29_1$–$29_4$ (referred to generally as 29), each of which is connected to a single communication link 16 (and thus assigned to the same location as the link). For example, communication links 16a–16c are connected to ports $29_1$–$29_3$ of node 28a, while port $29_1$ of node 28b receives communication link 16d. Nodes 28 should be disposed so that excessively long communication links 16 are not required. Thus, some nodes 28a are physically located within a room in which devices 12 are disposed (e.g., node 28a), while others (e.g., node 28b) are disposed outside of the room or rooms that they serve.

One storeroom 18 and a single patient room 20 are shown for ease of illustration. Of course, a typical hospital includes numerous other storerooms 18, patient rooms 20, and other areas (such as a biomedical engineering department and central supply area) in which devices 12 are located. In addition, although only seven devices 12a–12g are specifically shown, it will be readily apparent that a hospital typically includes many more devices 12. (For example, a 1000 bed hospital may have 5000 or so devices 12.)

Figure 2:
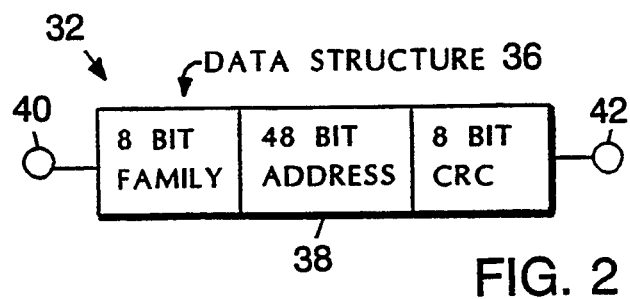
FIG. 2 shows the organization of a tag memory.
Figure 3:
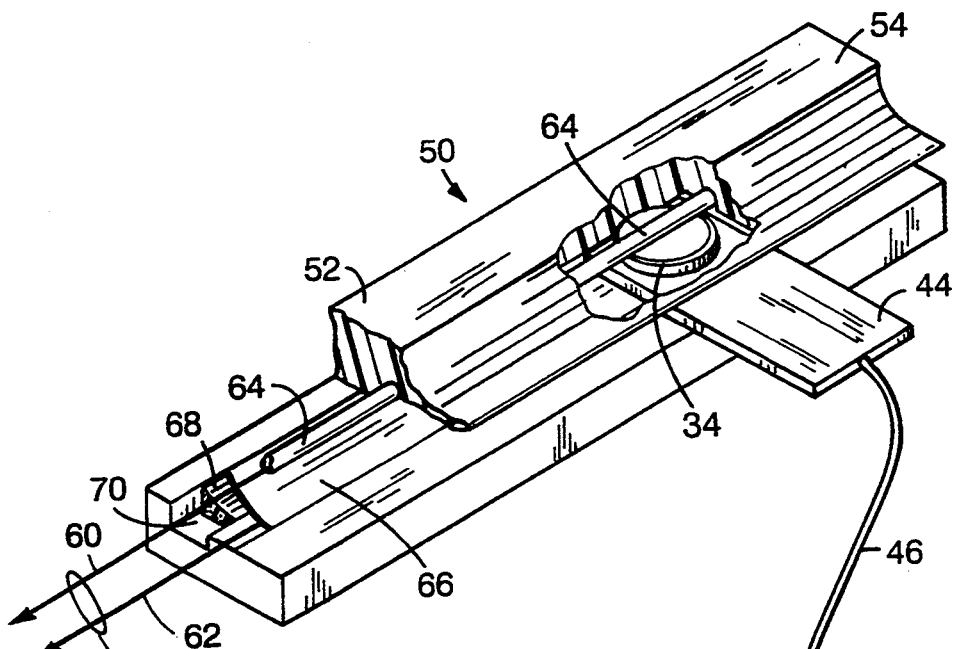
FIGS. 3 and 4 illustrate the connection of a portable device to the network via the attachment of a tag tethered to the device to a communication link.
Figure 4:
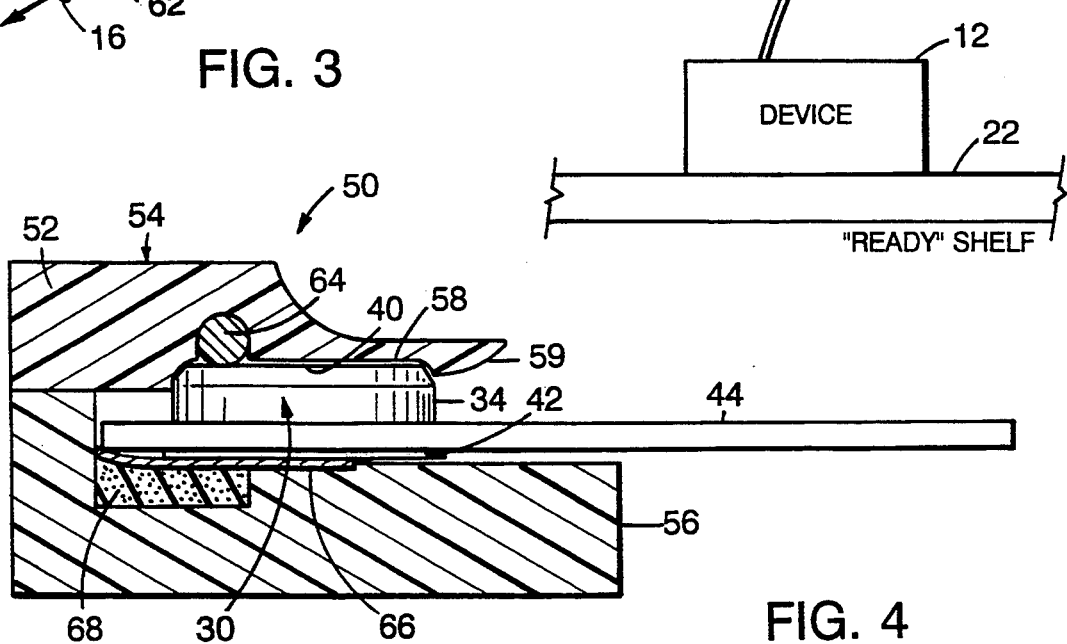

Referring also to FIGS. 2–4, every device 12 that is to be tracked (e.g., devices 12a–12g) is equipped with a corresponding electronic tag 30a–30g (designated generally as 30) that uniquely identifies the device 12. Tag 30 is an electronic data label or carrier, also known as a "touch memory" manufactured by Dallas Semiconductor Corporation of Dallas, Tex. (part number DS1990A). Tag 30 includes an integrated circuit memory 32 disposed within a metal housing 34. A unique data structure 36 that includes a forty-eight bit tag address 38, an eight bit CRC code, and an eight bit family code is laser etched in memory 32 during manufacturing. Memory 32 is accessed for reading via a pair of data ports 40, 42 that are electrically connected to the upper and lower metal surfaces of housing 34.

Tag 30 is relatively small and unobtrusive (approximately the diameter of a dime) and yet is quite rugged. Housing 34 is press fit onto one end of a plastic card 44 (using a small retaining ring, not separately shown, available from Dallas Semiconductor), the opposite end of which is glued or otherwise attached to a device 12 by a tether 46 (e.g., an 18" steel cord). It will thus be appreciated that tether 46 provides a simple, yet rugged connection of tag 30 to device 12. The connection is entirely non-electrical—that is, device 12 need not be modified or include electrical circuitry adapted to accept tag 30. Thus, virtually any device 12 can be equipped with a tag 30. Examples of such devices 12 in a hospital setting include patient care devices such as infusion pumps, vital signs monitors, sequential compression devices, pacemakers, and EKG machines, as well as other types of devices (e.g., electric blankets). Moreover, purely mechanical devices, such as wheelchairs and carts for carrying bulky patient care devices, can be fastened to a tag 30 with a tether 46 and card 44.

The communication links 16 which extend from each node 28 provide electrical connections between node ports 29 and the tags 30 of devices 12 located in rooms 18, 20 to which the node is assigned. As discussed in detail below, each node 28 determines which devices 12 are disposed in its assigned room 18, 20 by reading data structures 36 of all tags 30 connected thereto by communication links 16.

Each node 28 determines which communication link 16 any given tag 30 is connected to by detecting the port 29 on which data structure 36 is read. Thus, nodes 28 can group devices 12 based on the ports $29_1$–$29_4$ to which the device tags 30 are connected. A particularly useful implementation of this feature is to associate each port $29_1$–$29_4$ with a different condition (or status) that devices 12 may have. For example, port $29_1$ of node 28a is assigned to devices 12 located in storeroom 18 that are ready for use, port $29_2$ is designated for devices 12 that are in need of cleaning, and port $29_3$ is associated with devices that require repair. (Port $29_4$ of node 28a is shown as unused, but it will be appreciated that this port may be connected by a communication link 16 to another area in storeroom 18, or to another room.)

Figure 5:
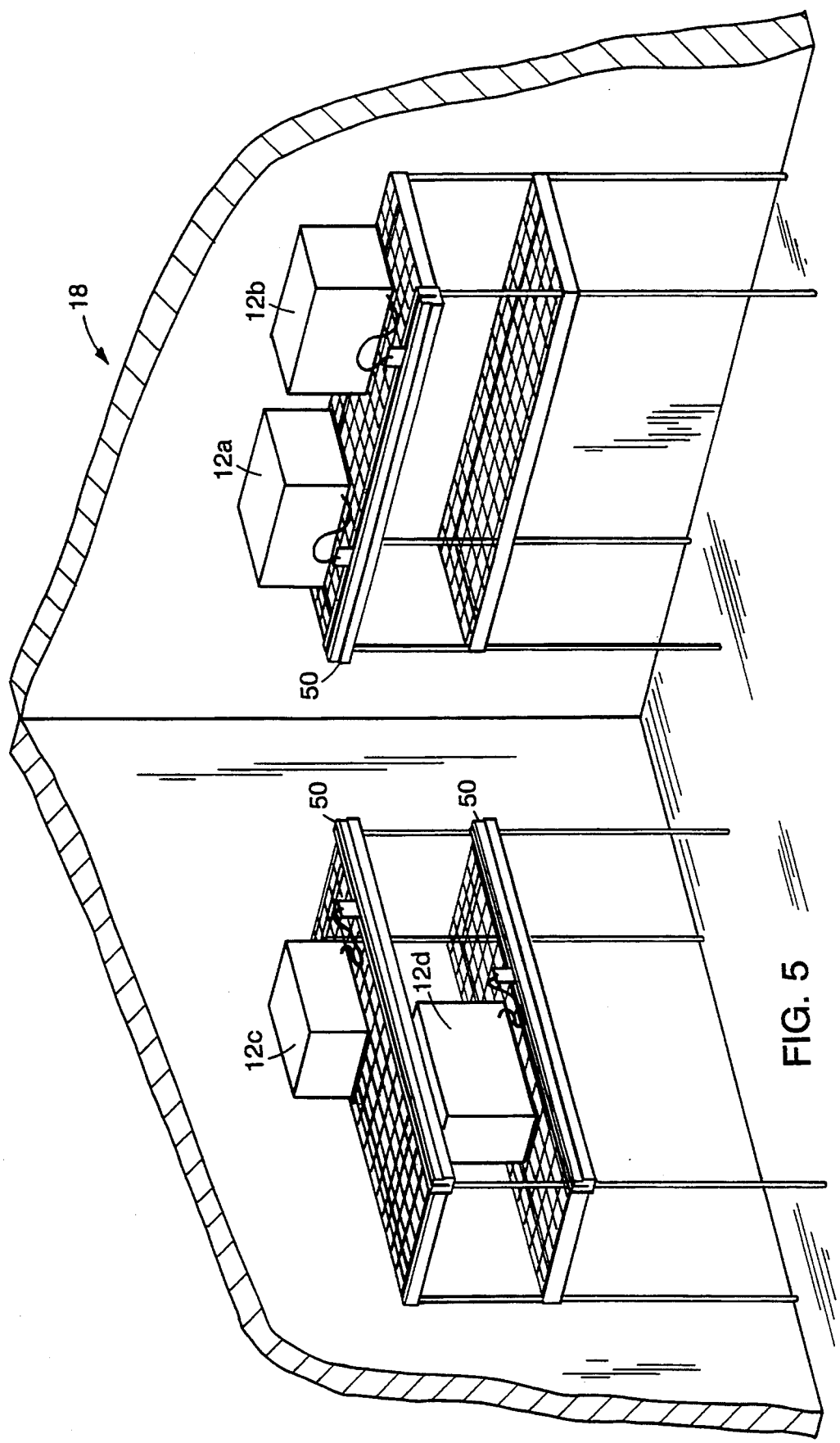
FIG. 5 is a perspective view of one of the locations (a storeroom), with various devices stored on shelves having tags connected to a communication link of the network.

Referring also to FIG. 5 and as noted above, storeroom 20 is subdivided into areas 22, 24, 26 that correspond to the different device conditions and which include one or more shelves for devices 12. Communication links 16a–16c are physically wired to the areas 22, 24, 26 that they serve, and are equipped with connectors 50 located on or near the shelves for receiving tags 30 (e.g., on the fronts of the shelves, as shown—alternative placements include the bottoms of the shelves, above the shelves, or on the wall behind the shelves).

Rooms in which devices 12 typically do not have different conditions that need to be detected (such as patient room 20) generally include only a single communication link (e.g., link 16d) connected to a port (e.g., port $29_1$) of the room's node (e.g., node 28b). Connector 50 for link 16d is located within easy reach of the user, typically on a wall near the bedside.

FIGS. 3 and 4 show connector 50 and its engagement with a tag 30 in detail. Connector 50 includes an elongated plastic body 52 of sufficient length to receive several, e.g., thirty tags 30. Body 52 includes an elongated, resilient clip 54 for capturing tag housing 34 against a rigid base 56. A channel 58 and a lip 59 on the underside of clip 54 help maintain housing 34 in place within body 52.

Each link 16 includes a shielded pair of wires 60, 62 (e.g., shielded telephone wire can be used for link 16). One wire 60 is electrically connected to a metal rod 64 that extends along the length of body 52 within channel 58. The other wire 62 is secured to a thin, resilient metal strip 66 that extends parallel to rod 64 along the upper surface of base 56. An elongated foam band 68 is positioned in a channel 70 beneath metal strip 66 to resiliently urge strip toward rod 64.

A user connects a tag 30 to a connector 50 by sliding card 44 into body 52 (vertically downward, in FIG. 5), with tag housing 34 facing clip 54. The height of housing 34 urges clip 54 away from base, allowing tag 30 to pass into body 52 until housing 34 fully enters channel 58. When this occurs, clip 54 snaps back to its original position, thereby seating housing 34 within channel 58 and behind lip 59. This provides a positive indication to the user that tag 30 has been properly inserted in connector 50. As is apparent from FIG. 3, the configuration of clip 54 and channel 58 prevents housing 34 from seating within body 52 if the user improperly inserts card 44 with tag housing 34 facing toward base 56, thereby helping to avoid improper insertion. A tag 30 is removed from connector 50 simply by pulling card 44 away from body 52. Housing 34 urges lip 59 away from base 56 as it slides out of channel 58.

When tag 30 is properly inserted in connector 50, memory 32 is securely and continuously connected across wires 60, 62 of communication link 16. That is, proper connection of tag 30 causes the upper surface of housing 34 (which serves as memory data port 40) to be secured against rod 64, and causes the lower surface of housing 34 (i.e., ground port 42 of memory 32) to be urged against strip 66. As will be apparent, when multiple tags 50 are inserted in connector 50, their tag memories 32 are connected in parallel across wires 60, 62. As a result, node 28 can continuously read data structures 36 of tags 30 (and hence identify devices 12) connected thereto via communication links 16 and port 29, as discussed in detail below. That is, node 28 continuously monitors the connection state of all tags 30 on a communication link 16 and detects changes in the connection state of tags 30. Moreover, if power is lost, node 28 rereads all data structures 36 connected to its links 16 when power is restored, thereby assuring that no connection information is lost.

Thus, referring again to FIG. 1, a user who places a device 12 in any room 18, 20 need do no more than place device 12 in the appropriate area (such as on "ready" shelf 22 in storeroom 18 or on an IV post in patient room 20) and insert tethered tag 30 into connector 50. Transparently to the user, node 28 assigned to the room reads data structures 36 and correlates it with the identity of the port 29 on which data structure 36 is read. Nodes 28 report this information to data access computers 80 (only two of which, 80a, 80b, are shown) on network 14, which in turn forward the information to a data management computer 82. Data management computer 82 maintains databases on all locations (and, where applicable, the conditions) of devices 12. The databases are accessible by users (e.g., hospital personnel) at data access computers 80 (and at other points on network 14), and thus serve as highly valuable tools for assisting hospital personnel in locating stored devices 12 and managing the inventory of devices 12. The databases are implemented using the Microsoft Foxpro 2.5 Database Management System for MS-DOS.

Figure 6:
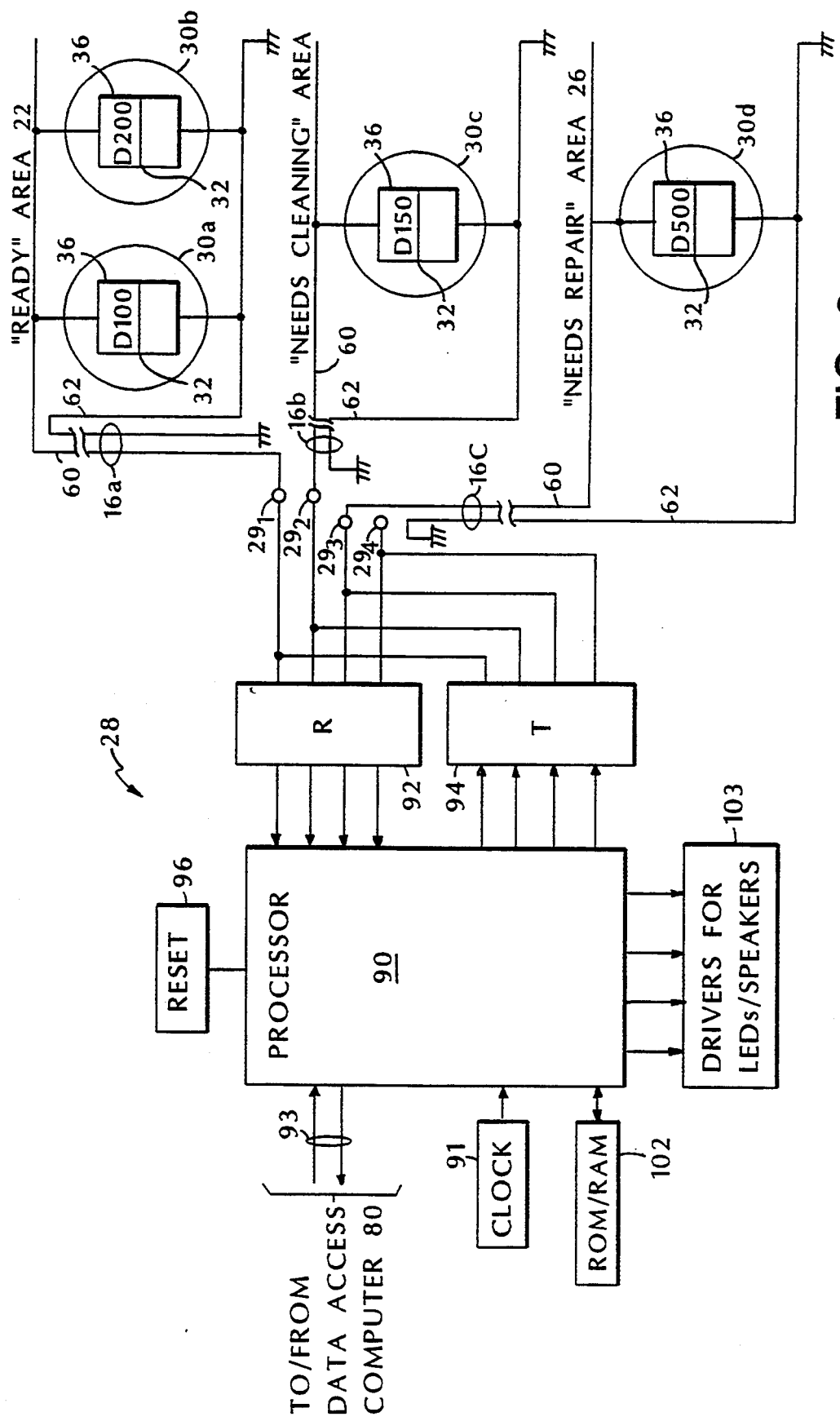
FIG. 6 shows details of a node of the network and its connection to multiple tags via communication links.

Referring to FIG. 6, each node 28 (node 28a is shown) includes a processor 90 (a Dallas Semiconductor DS2250T, which is comprised of a DS5000T processor mounted on printed circuit board with a memory and a real-time clock) for communicating with ports $29_1$–$29_4$. The data wire 60 (FIGS. 3, 4) of each link 16 is connected to a port 29 (the ground wires of links 16 are coupled to a common ground, not shown). Data read from communication links 16 is passed by a four channel receiver (R) 92 (which includes a comparator, not shown, for noise rejection) to processor 90. Processor 90 sends commands and data to communication links 16 via a four channel driver transmitter (T) 94, connected in parallel with receiver 92. Ports $29_1$–$29_4$ are pulled-up to a reference potential through a set of pull-up resistors (not shown). Timing for processor 90 is supplied by a 14.745 MHz clock 91.

Processor 90 communicates with data access computer 80a (FIG. 1) over a branch 93 of network 14. Branches 93 are shielded, two conductor wire, such as shielded twisted pair wire. The communication protocol is discussed below. Note, however, that the protocol used is a function of the distance between node 28 and data access computer 80a. Typically, to provide good quality communication over distances of 100 feet, the RS-422 or RS-485 standards could be used. The Dallas DS2250T communicates using an embedded serial port, and thus an RS-232 or RS-422 converter (not shown) may be inserted in branch 93.

Processor 90 communicates over data wires 60 of communication links 16 using a so-called "one wire protocol" and employs a "divide and conquer" procedure to read data structures 36 of all tags 30 connected to each link 16. When processor 90 is brought on .line (e.g., either initially powered up or restored with power after a power failure) a reset circuit 96 triggers processor 90 to initiate a search procedure to read, bit-by-bit, data structures 36 of all tags 30 coupled to each port 29. The search procedure is described in detail in *Book of DS 199x Touch Memory Standards* by Dallas Semiconductor (1992), incorporated herein by reference (see, in particular, Chapters 1, 4, and 5), and thus will not be described further here. Suffice it to say that processor 90 performs the divide and conquer procedure by performing a series of read and write operations on communication links 16. Processor 90 can derive the data structure 36 of each tag 30 in approximately 12.96 milliseconds using this procedure, and thus can, in theory, identify more than 75 different devices per second.

Processor 90 performs the divide and conquer algorithm simultaneously for all ports 29. For a given port (e.g. port $29_1$), processor 90 identifies one data structure 36 connected to that port $29_1$ during each search pass of the divide and conquer algorithm. Processor 90 continuously performs search passes until all N devices that are connected to a given port are identified. The process of identifying all N devices is called a search cycle.

Processor 90 employs various techniques to avoid mistaking noise and other spurious conditions on communication link 16 as a connection or disconnection of a tag 30. For example, a tag 30 is considered to be connected to a link 16 only if processor 90 identifies data structure 36 of that tag 30 during two consecutive search cycles and if data structure 36 is present on link 16 for a minimum period of time (such as 500 milliseconds after the connection is initially detected). Likewise, a tag 30 that has been attached to a link 16 is recognized by processor as being removed from link 16 only if data structure 36 of that tag 30 is not identified during two consecutive search cycles and for some minimum period of time (such as 2.5 seconds after the completion of the search cycle during which the disconnection is first detected). In either case, if the minimum time period has not expired after the second cycle, additional cycles are performed before the connect/disconnect event is deemed valid.

Processor 90 maintains, for each port $29_1$–$29_4$, a binary tree that identifies data structures 36 of all tags 30 connected to that port. The binary trees are stored in a RAM portion of memory 102 (the ROM portion of memory 102 stores the operating program for processor 90). When a tag 30 is recognized as being attached to a communication link 16, processor 90 adds data structure 36 of that tag to the corresponding binary tree. Likewise, when processor 90 detects that a tag 30 has been removed from a link 16, it deletes data structure 36 of that tag 30 from the appropriate binary tree. Storing data structures 36 in binary trees allows processor 90 to efficiently determine when tags 30 are connected or disconnected, and thus significantly reduces the time needed to perform the search passes and search cycles.

In the example shown in FIG. 6, upon startup, processor 90 maintains a binary tree for each port (e.g., for ports $29_1$, $29_2$, $29_3$, and $29_4$). (Because no devices are connected to port $29_4$, its binary tree is empty.) The tree for port $29_1$ includes data structures 36 of tags 30a (D100) and 30b (D200). Only one data structure 36 (D150 of tag 30c) is stored in the binary tree associated with port $29_2$; likewise, the binary tree maintained for port $29_3$ contains a single data structure, D500, of tag 30d.

Figures 7, 8, 9:
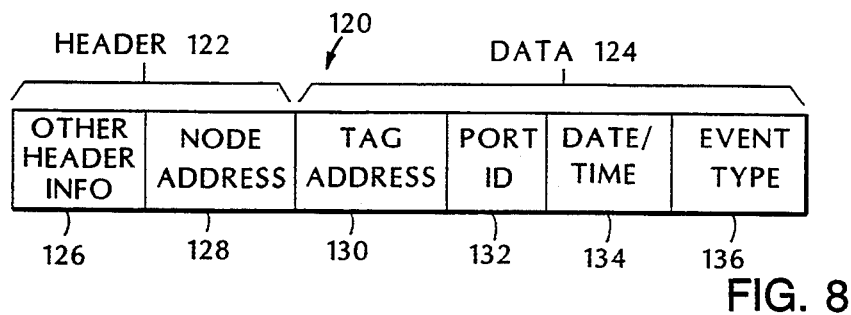
FIG. 7 shows an event queue maintained by a node.
FIG. 8 illustrates the organization of messages sent by a node to a data access computer over the network.
FIG. 9 is an activity file stored on the network.

Referring also to FIG. 7, whenever processor 90 detects an event—e.g., a new connection of a tag 30 to a link 16 or a disconnection of a tag 30 from a link 16—it records the event as an entry 98 in an event queue 100 (which is stored in the RAM portion of memory 102). The data in entries 98 are reported, one at a time, to data access computer 80a (FIG. 1) via branch 93, as described in detail below. In addition, to provide feedback to the user that the event has been recognized, processor 90 sends a signal to drivers 103 to activate a speaker or LED (not shown) positioned adjacent connector 50 (FIG. 1) of the link 16 on which the event occurred. The speaker and LED can emit different signals for connect and disconnect events.

Each entry 98 includes data structure 36 of the tag 30 that caused the event, and a stamp 104 that identifies the date and time of the event and a code 106 that identifies the type of event (e.g., "C" for connect, "D" for disconnect). Other link events (such as a short-circuit) may also be recorded for maintenance purposes.

Processor 90 also designates the port 29 at which the event occurred in a field 108 of entry 98. Each port 29 in system 10 is assigned a unique identification, which processor uses in field 108. For example, ports $29_1$–$29_3$ of node 28a are assigned port IDs 001, 002, and 003. Note that with some nodes 28 (such as node 28a), port identity is also associated with a condition of a device 12. Thus, port IDs 001–003 also correspond to the "ready," "needs cleaning," and "needs repair" conditions discussed above. The conditions are inherent in the port IDs in field 108, and thus node 28a does not separately specify the conditions in entry 98. (As discussed below with reference to FIG. 9, the port IDs in field 108 are associated with condition code IDs in field 144 of activity files 140 maintained by data access computers 80.)

FIG. 7 shows the state of event queue 100 when processor 90 performs the reset procedure discussed above. Processor 90 determines that tags 30a, 30b with the data structures D100 and D200 are connected to port $29_1$ (by communication link 16a), which corresponds to "ready" area 22 of storeroom 18. Similarly, processor 90 detects that tag 30c (address D150) is connected (via link 16b) to port $29_2$ (which corresponds to "needs cleaning" area 24 of storeroom 18). Finally, processor 90 detects that tag 30d (address D500) is connected to port $29_3$ (which corresponds to "needs repair" area 26 of storeroom 18). Thus, each entry 98 identifies a data structure 36, a location code 108 of "001" and a connect ("C") event type. In addition, each entry 98 is stamped 104 with the date and time (e.g., Dec. 1, 1993; 12:00) at which processor 90 has identified data structure 36 connection activity for the two consecutive search cycles and minimum time period discussed above.

Processor 90 continuously performs search cycles for each link 16 and regularly updates the binary trees and event queue 100. For example, if another device 12 is placed on "needs repair" shelf 26 and its tag 30 connected to communication link 16c, processor 90 recognizes the connect event two search cycles later. In addition to updating the binary tree for port $29_3$, processor 90 creates a new event entry 98 in queue 100 that identifies data structures 36, port 293 (ID 003), condition code "R" and event type "C"; new entry 98 also is stamped 104 with the date and time of the connection.

Conversely, if, for example, device 12a is removed from storeroom 18, processor 90 recognizes the disconnection of tag 30a from link 16a two search cycles later, and creates a new entry 98 in event queue 100 for the event. The fields of new entry 98 identify data structure 36 (D100), port 291 (ID 001), condition code "C," the date and time 104, and disconnect ("D") event code 106.

Moreover, if device 12a is subsequently connected at another location on network 14, node 28 that is interfaced to the communication link 16 associated with that location detects the addition of tag 30a in the same manner as discussed above. For example, consider that device 12a is moved to patient room 20, and tag 30a is connected to link 16d. Processor 90 of node 28b detects the connect event, updates the binary tree associated with link 16d, and adds an entry in its event queue so that the new port ID (and thus location) of device 12a can be reported to data access computer 80a over network branch 93.

Note that each data access computer 80a, 80b is shown connected to only one node 28a, 28b. In practice, other nodes 28 which serve as interfaces to other sets of communication links 16 are connected via branches 93 to each data access computer 80. Moreover, system 10 typically will include other subsystems 116 of communication links 16, nodes 28, and data access computers 80, as needed to monitor the various storerooms, patient rooms, and other locations in the hospital. For example, each hospital floor may include multiple subsystems 116, with data access computers 80 being placed at nurses stations or other strategic points on the floor. Other computers 118 are also connected to network 14 for communicating with data access computers 80 and data management computer 82, as explained below.

The information in event queue 100 is transferred to a data access computer 80 using a command/response protocol. A data access computer (e.g., computer 80a) begins the sequence by sending "event get" command messages sequentially to each node 28 at a rate of approximately once per second. Each event get message identifies a single node 28 as the target of the command. Each node (e.g., node 28a) responds to an event get message targeted to it by returning to data access computer 80a a response message that contains information from one entry 98 of event queue 100. A node 28 sends only one response message in reply to an event get command, even if several events have been logged in queue 100 since the previous event get command. The contents of event queue 100 are transferred to data access computer 80a on a first-in-first-out (FIFO) basis.

Referring also to FIG. 8, the format of a response message 120 is shown. Response message 120 includes a fixed-length header component 122 and a variable length data component 124. Header 122 is twelve bytes long and includes fields 126 (not separately shown) that identify the start of the header, message sequence number, message type, the byte length of the data component, and a header CRC. Header 122 also includes a field 128 for the address of node 28a (the same address found in the event get command). Data component 124 is between 0 and 255 bytes long, and includes data from the entries of the next entry 98 in event queue. Tag address 38 (of data structure 36) and port ID 1.08 (FIG. 7) are placed in fields 130 and 132. Time/date stamp 104 is sent in field 134, and event type code 106 is placed in field 136. A two byte data field CRC (not shown) is also included. When data from an entry 98 is packaged in a response message and sent to data access computer 80, the entry is deleted from queue 100.

Referring also to FIG. 9, data access computers 80 transfer data 124 from response messages 120 to a text file 140 that is stored on network server 83 and shared by all data access computers 80. For example, text file 140 is stored on network server 83 (FIG. 1). Computers 80, 82 exchange messages through network server 83 (as do .other computers 224, 234—FIG. 17) using a standard (e.g., Ethernet) communications protocol over network branches 95 (which are, e.g., coaxial cables).

Before sending data 124 to text file 140, however, each data access computer 80 replaces port ID 108 (FIGS. 7, 8) with a code 142 that corresponds to the location that the port ID represents. Additionally data access computer adds a code 144 that corresponds to the condition associated with the port ID. Data access computer 80 maintains a configuration file (FIG. 1) that relates port IDs with location codes 142 and condition codes 144.

For example, data access computer 80 uses the configuration file to determine that port IDs 001-003 (FIG. 6) correspond to storeroom 18. The configuration file is also used to determine that port ID 001 is additionally associated with the "ready" condition, port ID 002 represents the "needs cleaning" condition, and port ID 003 corresponds to the "needs repair" condition. Like port IDs 108, location codes 142 all differ from each other, so that each location code 142 uniquely identifies a single location. For example, location code "100" represents storeroom 18, while patient room 20 is represented by location code "210." Condition codes 144 uniquely specify the various device conditions that are tracked by system 10. For example, code "C" indicates the "ready" condition, code "D" designates the "needs cleaning" condition, and the "needs repair" condition is denoted by code "R." (Condition code 144 defaults to the "clean" condition (designated C* in FIG. 8) for ports (such as ports 29 of node 28b) that do not correspond to a specific device condition.)

Entries 146 are added to activity file 140 in chronological order according to the date/time stamp 104 (FIG. 6) of the event to which entry 146 corresponds. The date/time stamp of the event is stored as a field 145 in entry 146. Also stored as fields of entry 146 are tag address 38, the event type code (C or D), location code 142, and condition code 144—all of which are supplied by data access computer 80.

In the example shown in FIG. 9, the first four entries 146 of activity file 140 correspond to entries 98 in event queue 100 of node 28a. If we assume that as of system startup (12:00 on Dec. 1, 1993), no other devices 12 are connected to communication links 16, activity file 140 contains no other entries 146. If, for example, another device 12e is connected to communication link 16d in patient room 20 (FIG. 1) an hour later (i.e., at 13:00), system 10 responds as follows. First, node 28b detects the addition of tag 30e (which has an address of D50) in the manner described above and reports the connect event to data access computer 80b (when entry 98 for this event reaches the top of queue 100). Data access computer 80b determines the location code 142 that corresponds to patient room 20 (i.e., code "210"), and also determines that a condition code 144 is not applicable. Data access computer 80b adds an entry 147 to activity file 140 identifying the new connection. Entry 147 includes the event date/time stamp, tag address 38 (D50), event type (C), location code 142 (210), and condition code 144 (C*) of the new connection of device 12e.

Similarly, if devices 12f (data structure D300) and 12g (data structure D75) are subsequently placed in patient room 20 and their tags 30f, 30g connected to communication link 16d, new entries 148, 149 are added to activity file 140 in the manner discussed above. Disconnection events are also recorded in activity file 140. For example, assume that device 12e is subsequently removed from patient room 20. The disconnection of tag 30e from communication link 16d is sensed by node 28b and reported to data access computer 80b as discussed above. Data access computer 80b responds by adding an entry 150 to activity file 140 that identifies the date and time (i.e., Dec. 3, 1993 at 11:50) of the disconnection, data structure D50 that corresponds to device 12e, disconnect event code D, location code 210, and condition code 144.

Data management computer 82 (FIG. 1) maintains an activity database 160 (FIG. 1) the entries of which contain the same entries as activity file 140. Data management computer 82 periodically checks activity file 140 for the presence of event entries 146-150. If one or more entries 146-150 are found, data management computer 82 retrieves entries 146-150 over network branches 95 and appends them to activity database 160. Event entries are appended to activity database 160 in chronological order (based on date/time stamp 104). Data management computer 82 also deletes the retrieved event entries from activity file 140 to ensure that it will find only "new" event entries the next time that activity file 140 is checked. Because activity database 160 is identical in structure to file 140 (FIG. 9), its contents are not shown in a separate figure or described in detail here. To avoid activity database 160 from becoming excessively large, it is periodically (such as once daily) downloaded into long-term (e.g., disk) memory, not shown.

Referring to FIG. 10, data management computer 82 maintains an inventory database 170 for all devices 12 that are currently in hospital inventory. Database 170 is organized according to tag addresses 38 of data structures 36, and includes a single entry 172 for each device 12. Each entry 172 identifies location code 142 (in field 174), condition code 144 (in field 176), date/time stamp 104 (in field 178), and event type code (in field 180). Data management computer uses the contents of activity database 160 to maintain current the information stored in fields 174–180. That is, inventory database 170 stores up-to-date information about the location and condition of each device 12, as well as the date and time of the most recent network event of that device 12 and the type of the event (i.e., connect or disconnect).

Each entry 172 also includes a field 182 the contents of which identify the type of device 12 represented by tag address 38. For example, devices 12a and 12e are two different types of infusion pumps (PUMP100 and PUMP200). Device 12b is a portable monitor (PRTMON). Device 12c is an air compressor with a thigh sleeve (ACTHIGH); device 12f is another type of air compressor with a knee sleeve (ACKNEE). Devices 12d and 12g are both vital signs monitors (SIGNSMON).

Various other fields (identified collectively with reference numeral 184) are used to store other information about devices 12. For example, fields 184 contain:

1) a detailed description of the device (i.e., "vital signs monitor, model XYZ");
2) the manufacturer's name (and, possibly, address);
3) the serial number;
4) date of next scheduled maintenance;
5) interval since maintenance was most recently performed;
6) the hospital's property control number.

As will be appreciated, activity database 160 and inventory database 170 are highly dynamic in that their contents change often. Data management computer 82 also maintains a number of more static databases (denoted generally as 190 in FIG. 1) that correlate the various codes (e.g., location, condition, event type, device type, etc.) to text strings for generating inventory reports and messages to system users, as discussed in detail below.

FIGS. 11–15 show the various static databases 190. Hospital location database 191 (FIG. 11) relates location codes 142 to full text descriptions of the locations. For example, location code 100 is equated to the full name associated with storeroom 18 (such as "White Building, 10th Floor"). Similarly, location code 210 is related to the full name of patient room 20 (e.g., "Smith Building, Room 2302").

Condition database 192 (FIG. 12) relates condition codes 144 (i.e., C, R, D) to textual descriptions of the device conditions ("clean," "needs cleaning," "needs repair"). As discussed above, additional condition codes may be used. For example, links 16 to patient rooms may be assigned a condition of "in use" (the code 144 for which is, say "U"), rather than being defaulted to the "clean" condition.

FIG. 13 shows event type database 193. Entries of database 193 relate the event type codes (C and D) to a full text description of the event (e.g., "connect" and "disconnect"). If other types of events (such as short circuiting of links 16) are to be monitored, codes for these events (such as "S") are correlated to a description of the event ("short circuit") in database 193.

As discussed below, one of the reports generated by system 10 is an inventory report for an area (such as a floor) of the hospital. The report contains such information as the types of devices that are expected to be kept on the floor (e.g., in a storeroom such as storeroom 18), the minimum quantity (called a "par level") of each type of device that the floor should have, and the optimum quantity of each type of device. Par level database 194 (FIG. 14) relates various hospital locations to device types and the par and optimum quantities of each device type. Each entry 195 of database 194 contains fields for location code 142, device type (the same kind of information that is stored in field 182 of inventory database 170), par quantity, and optimum quantity.

Note that because each floor will often stock several types of devices 12, par level database 194 includes multiple entries 195 for each such location. For example, database 194 includes three records 195 for location code 100 (storeroom A)—one for each type of device that personnel expect to have available on this floor. The par quantity and optimum quantity of each device type are stored in record 195 for that device type.

The device types found in inventory database 170 and par level database 194 are relatively short designations of each kind of device. Each device type is related to a full description of that device in device database 196 (FIG. 15). For example, the device type "SIGNSMON" is seen to be a "Vital Signs Monitor."

Referring to FIG. 16, data management computer 82 also creates and maintains a floor inventory database 200 based on the contents of inventory database 170 (FIG. 10) and static databases 190. Floor inventory database 200 is essentially a temporary file used by computer 82 to generate reports and check par levels (and produce warning messages if the number of available devices for a given floor fall below par level). Floor inventory database 200 contains one or more entries 202 for each type of device that is expected to be maintained at a location. Thus, there typically are multiple entries 202 for each location. Entries 202 for storeroom 18 (location code 100) are shown in FIG. 9. It will be appreciated that floor inventory database 200 contains many more than the few entries shown.

Each entry 202 includes a field that indicates a device type (e.g., "BOOT"). For each device type, other fields of entry 202 designate the number of clean devices, the par level, the optimum level, the number of devices that are dirty (i e., "need cleaning"), and the number of devices that are broken (i e., "need repair"). It will be appreciated that data management computer calculates these numbers based on the information contained in inventory database 170. Each entry 202 also includes a message field 204 containing a textual message 206 (e.g., "WARNING") that is reported or displayed to the user when the number of clean devices falls below the par level. The use of messages 206 is discussed below.

Figure 17:
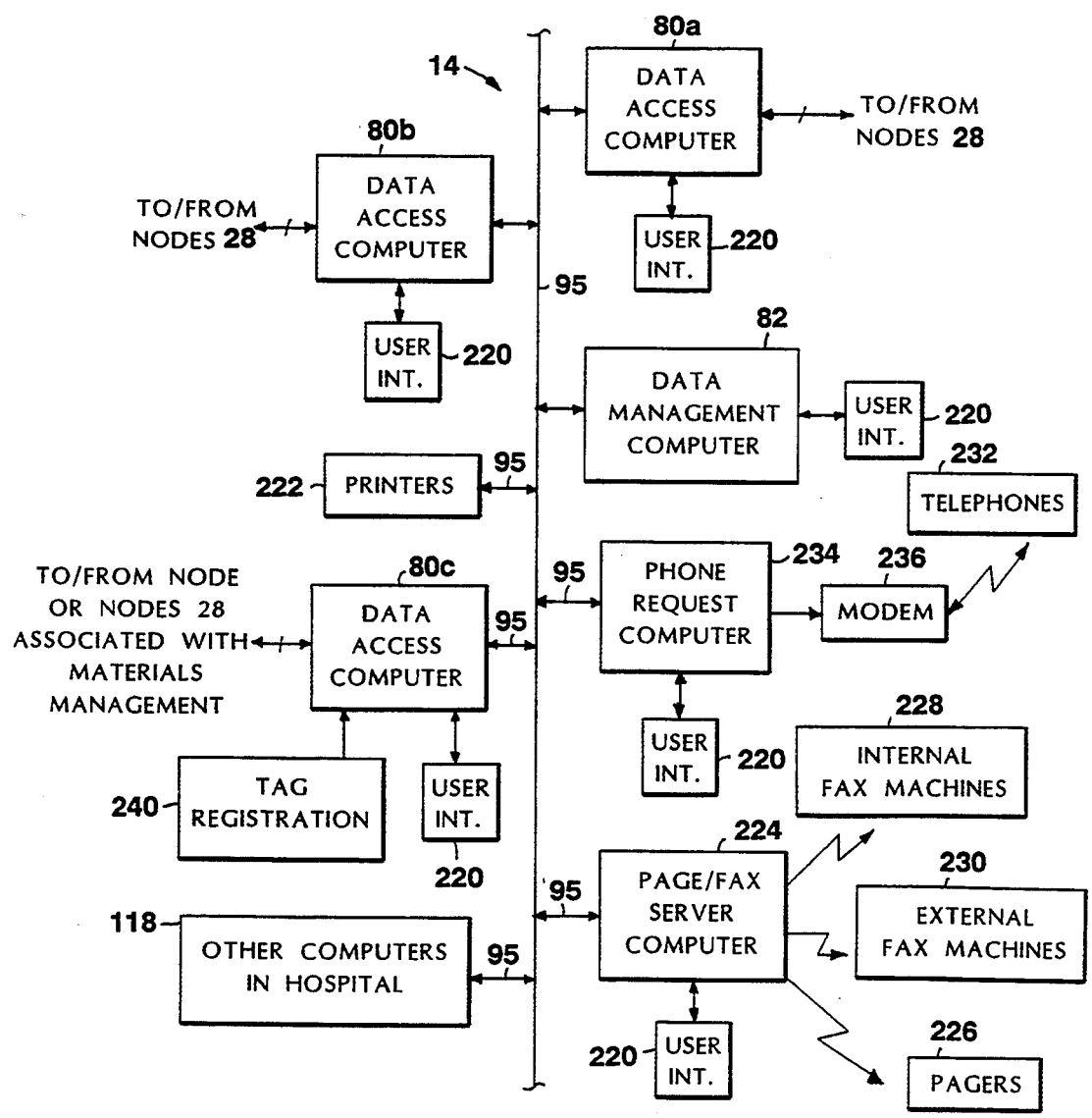
FIG. 17 is a functional block diagram of computers connected on the network.
Figure 21:
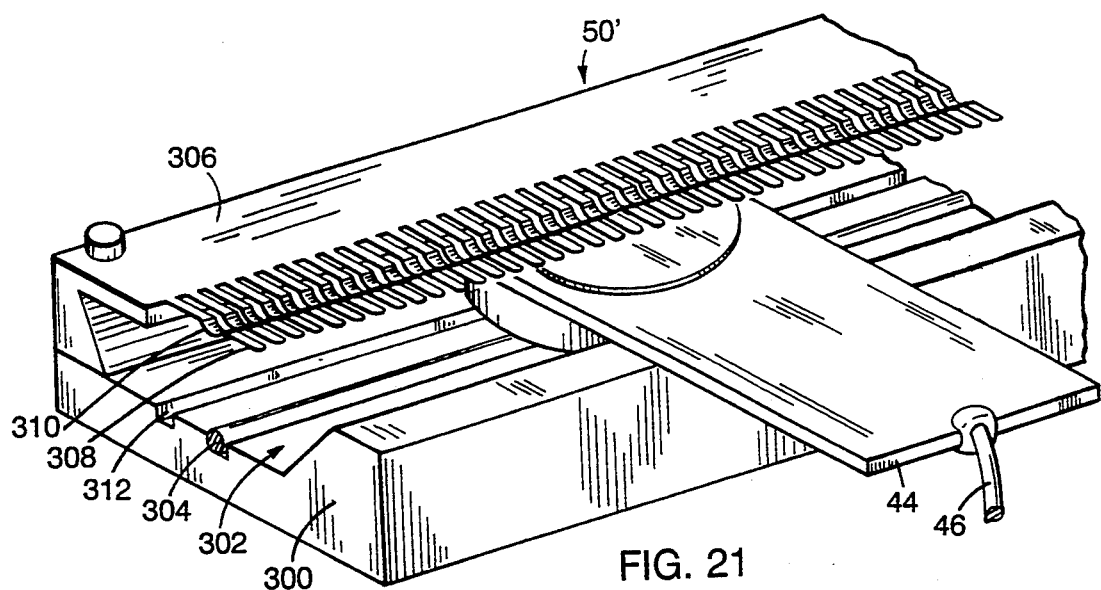
FIGS. 21–26 show alternative techniques for connecting tags to a communication link.

Referring to FIG. 17, several other computers and peripheral devices are linked to network 14 allow the database information maintained by data management computer 80 to be accessed throughout the hospital and from outside of the hospital (by authorized users). That is, network 14 forms part of a hospital-wide information network (one example of which is discussed in copending patent application Ser. No. 07/932,924, assigned to the present assignee and incorporated herein by reference). As discussed below, with user interfaces 220 (such as a CRT and keyboard, mouse device, etc.) at data access computers 80, data management computer 82, or other computers 118 linked to network 14, users can generate requests for devices 12 or for hospital personnel, and can create reports on the inventory of devices on a single floor or a number of floors.

Requests and reports can be sent to printers 222 located anywhere on network 14. In addition, a page/fax server computer 224 linked to network 14 allows users to page and send requests to hospital personnel equipped with pagers 226. Page/fax server 224 also intercepts messages from data management computer 82 to send textual messages 206 (FIG. 15) to a pager 226 when, for example, a par level has passed a threshold, or if data management computer 82 detects that a selected tag address 38 (which, of course, uniquely corresponds to a device 12) has been detected. This latter example illustrates another useful inventory management feature of the invention, in which a user can "flag" a selected device 12 to data management computer 82 by entering the corresponding tag address 38 via any user interface 220. When data management computer 82 detects a connection of that tag address 38 in activity file 140 on network server 83, it generates a message on network server 83 for interception by page/fax server computer 224.

Page/fax server computer 224 also sends faxes of reports to fax machines 228 located in the hospital (such as at nurses stations) or to externally-located fax machines 230 (e.g., at a vendor of devices or at a repair facility). Faxes of reports can be requested through phone request computer 234 by dialing a code (e.g., at any telephone within the hospital) that designates the report and the destination fax telephone number. Requests for devices 12 or reports may also be entered by a telephone 232 (from either within or outside of the hospital) through the use of a phone request computer 234 on network 14 and a modem 236.

Devices 12 that are added to inventory and stored (at least initially) in a materials management area of the hospital are registered on system 10 using a data access computer 80c. Data structures 36 of newly-added devices 12 are read by any suitable input device 240 capable of reading tags 30 (such as a "touch wand" available from Dallas Semiconductor), and connected to user interface 220 of data access computer 80c. The user enters information about the new device (e.g., name, manufacturer, serial number, hospital property number, etc.) with interface 220. Data access computer 80c transfers this information to data management computer 82, which adds it to inventory database 170. Of course, the materials management area is coupled to network 14 by communications links 16 so that information on the devices stored in this area is available to network users.

One example of a report which a user can create identifies the locations of all devices 12 of a certain type (e.g., air boots). Likewise, the user can create a report that identifies all devices 12 that are stored at a selected location (such as on the user's floor), or in a set of locations (e.g., one or more floors adjacent to the user's floor). Reports can be restricted to devices having a selected condition (e.g., "ready"), or not.

Likewise, a user who needs, for example, an infusion pump, or an infusion pump with a particular address 38, but who is unable to locate such a device 12 in his or her immediate area, can use data management computer 82 (through user interface 220) for locations of such infusion pumps, when tag addresses 38 corresponding to those devices 12 are communicated to data management computer 82 from a data access computer 80 or other networked computer 118. Data management computer 82 can send a textual message 206 (FIG. 16) to page/fax server computer 224, which will in turn send a message to pager 226 when any of the designated conditions have occurred. The user can restrict the query according to the condition of devices 12 (such as "ready"), and can also limit the query to his or her floor or one or more adjacent floors. Computer 80 or 118 either displays the report on its CRT (not shown) or prints the report on a printer 222.

Requests are sent over network 14 in much the same way as described above for messages 120. The requests are temporarily stored in network server 83 (FIG. 1) in a shared request file (not shown) that is similar to activity file 140. Data management computer 82 periodically retrieves the requests and erases retrieved requests from the shared request file. The requests are acted upon in the order in which they are received. Alternatively, requests may be handled in order of priority (such as "STAT," "LOW," etc.), as assigned by the user in the request message.

The use of fax machines 228, 230 for reports is particularly useful in helping users on each floor keep track of locations of devices 12 that have been assigned to the floor but that have been loaned to (or borrowed by) users on other floors. Data management computer 82 maintains a database (not shown, but similar to location database 191) that associates each fax machine 228, 230 with its location (e.g., floor) and fax number. Periodically (such as once per day), data management computer 82 sends a report to each internal fax machine 228 that identifies each device 12 assigned to that floor but that data management computer 82 has determined is located elsewhere (e.g., on another floor), and lists the present off-floor locations of the devices. The on-floor users can use this information in any appropriate way.

Telephones 232 enable users to locate devices 12 from any telephone in the hospital. Data management computer 82 maintains a database (not shown, but similar to location database 191) that associates each telephone number with a location in the hospital. When a user calls into system 10, phone request computer 234 prompts the user to identify the type of device 12 being sought using the telephone keypad. For example, the user is prompted to enter "1" for an air boot, "2" for an infusion pump, "3" for a vital signs monitor, and so forth. Phone request computer 234 determines the extension of the incoming call using keypad entries made by the user, and passes this information to data management computer 82 via network 14. Data management computer 82 determines the location of the nearest available device 12 of the type the user has requested. Data management computer 82 passes this information back to phone request computer 234 which, using a computer generated voice message, relays this location to the user. (Of course, devices 12 that are in use in a patient room 20 are not "available" to the calling user, and thus data management computer 82 considers only storerooms and other holding areas in determining the location of the nearest available device 12.)

In much the same way, the device location, identification, and condition information stored in inventory database 170 can also be accessible by users located outside of the hospital via external telephones. This enables device vendors and repair facilities (not shown)

to query data management computer 82 for information related to the various services that they provide. For example, a vendor who rents devices 12 to the hospital and charges the hospital based on the amount of usage of each device, can differentiate between devices 12 being used and devices 12 that are in storage using the information contained in inventory database 170. Repair facilities can determine the types and quantities of devices 12 that need repair (based on condition codes 144) as a basis of coordinating service calls to the hospital and readily determining the locations of devices 12 that need to be removed from the hospital for repair.

The telephone link can also extend to one or more other buildings of the hospital (not separately shown). This configuration is particularly advantageous when it is impractical to physically wire network 14 to the other buildings. In this case, each building linked to system 10 would include a local network similar in configuration to network 14.

Referring to FIG. 18, data management computer 82 tracks all requests for devices or personnel (whether sent via pager 226 or displayed, printed, or faxed) and all reports (whether displayed, printed, or faxed) in a request database 250. Only three entries 252 in database 250 are shown; typically, many more entries 252 are listed. Each entry includes a field 254 which stores the date and time at which the request is made. The type of request is listed in field 256. Examples of request type include "report," "device," and "personnel."

Report requests ask for a report to be generated and sent to a particular destination. As such, entries 252 for reports include data in report type field 264, priority field 266, and send-to field 268. Several different types of reports are possible. One example is a floor inventory report (called "floor" in database 250), described below. Others include reports as to the locations and/or conditions of specific types of devices 12, and global reports (which list the locations and conditions of all devices 12). Anther example of a floor inventory report is one that identify equipment that has not been connected to any communication link 16 within a designated time frame. Moreover, because the disconnection of a tag 30 of a device 12 from a communication link 16 of a storeroom indicates that the device is in use (e.g., in a patient's room), reports of the percentage of time in which certain devices 12 are used can be compiled using inventory database 170.

Send-to field 268 identifies the device on network 14 that is to receive the report. Reports can be sent to the display screen of any networked computer, a printer 222 (in this example, "printer 05"), or a fax machine 228, 230 (Data management computer 82 maintains a static database 190 (not separately shown) which relates the information in send-to field 268 to a full description of the printer and its location.)

Another type of request is a "device" request (illustrated by the second entry 252 in database 250). Device requests are sent to individuals to instruct them to bring a selected type of device to a specified location. Thus, entries are made in person ID field 258, identifying the person ("820") that is to receive the device request, device type field 260, indicating the device type requested ("BOOT"), and pager ID field 262, identifying the pager of the target individual (e.g., P18). The priority of the request (e.g., 2 hours) is indicated in field 266. The location to which he or she is to bring the device is identified in miscellaneous field 270 (such as with a location code 142). The target individual acknowledges receipt of the page through user interface 220 of data management computer 82, which relays the acknowledgement to the data access computer 80 from which the request was made.

A personnel request type is illustrated by the third entry 252 in database 250. Person ID field 258 designates the individual being sought (e.g., 1025), and his or her pager is identified in field 262 (P21). The priority of the request (in this case, "STAT") is listed in field 266. Miscellaneous field 270 identifies the location to which the person is to go.

Referring also to FIG. 19, data management computer 82 maintains a pager database 280 (i.e., one of static databases 190) each entry of which relates each person ID to a full description of one individual. For example, the person's full name, and also his or her department is listed. Pager database 280 also correlates each pager ID to a complete pager telephone number.

Data management computer 82 uses the information in request database 250, pager database 280 (and other databases, as needed) to create a message that is sent over network 14 to page/fax server computer 224 (FIG. 17). Data management computer converts the information in device type field 260 and the message in miscellaneous field 270 to a text string (e.g., up to 80 characters in length), and includes the string in the page message. Page/fax server computer 224 responds by sending the message to pager 226 of the target individual.

Data management computer 82 maintains a log (not shown) of all faxes and pages that are sent. Each entry in the log lists the person ID of the individual to whom the fax or page is directed, as well as the date and time of the message. In addition, each log entry includes the fax or pager number and a text string of the faxed or paged information. For pages, the text string is identical to the 80 character string sent to the pager. For faxes, the text string identifies the file that data management computer 82 sends to fax server 224.

FIG. 20 illustrates an example of a floor inventory report 290 for White Building, 10th Floor (i.e., location code 100). Floor inventory reports may be requested by a user (in which case the report is identified by an entry in request database 250). In addition, data management computer 82 may periodically generate floor inventory reports and transmit them over network 14 to printers 222 located on the various hospital floors.

Floor inventory report 290 identifies 292 the subject floor, and includes an entry 294 for each type of device 12 that is to be tracked on that floor. Each entry 294 lists the full name of the device type (from database 196) and the quantities of devices that are "ready," that "need cleaning," and that "need repair." Each entry also identifies the par level and optimum level of the corresponding device type.

When data management computer 82 generates floor inventory report 290, it includes an entry for a device type if: (1) a nonzero par level has been specified (in database 194) for that type of device, or (2) there is at least one device that is "ready," or "needs cleaning," or "needs repair." Thus, comparing inventory report 290 with floor inventory database 200 (FIG. 16), it is seen that entries 294 are included for all device types other than "ACTHIGH" devices. This is because no devices 12 of this type that are "ready," "need cleaning," or "need repair" are stored in this location, and because this device type has a par level of 0.)

In addition, floor inventory report 290 includes a message 296 (obtained from database 200) adjacent to any entry 294 having a par level greater than the number of clean devices. Thus, report 290 contains the message "warning" 296 adjacent to the entry for vital signs monitors.

Data management computer 82 continually monitors floor inventory database 200, for example, to detect when the quantity of clean devices on any floor falls below the par level. Each time that such an event is detected, data management computer 82 updates the floor inventory report 290 for that floor and transmits a warning 296 message string to a pager ID 262 that has been designated in pager database 280.

OTHER EMBODIMENTS

Other embodiments are within the scope of the following claims.

For example, other types of connectors 50 can be used on communications links 16. Referring to FIGS. 21-24, connector 50' includes a plastic base 300 which has a trapezoidal-shaped trough 302 formed therein for receiving tag housing 34. A wire 304 mounted in the lower surface of trough 302 provides the electrical connection between tag memory input port 40 (FIG. 2) and data wire 60 (FIG. 3) of communication link 16. The electrical connection to ground wire 62 of communication link 16 is provided via a metal sheet 306 that includes a series of flexible fingers 308 and is secured to the upper surface of base 300, above trough 302. Each finger 308 includes a rounded boss 310 for contacting the lower surface of tag housing 34 (and thus memory ground port 42).

Figure 22:
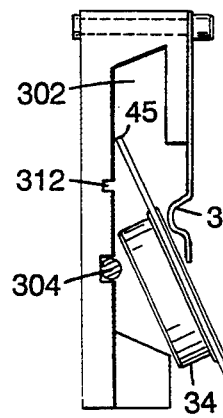
Figure 23:
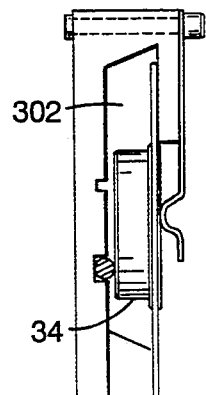
Figure 24:
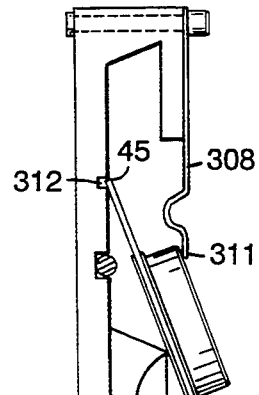

The shape of trough 302, the positioning of sheet 306 and fingers 308, and a groove 312 disposed lengthwise in trough 302 helps avoid improper insertion of tag housing 34 and card 44 by the user. FIGS. 22 and 23 show the proper insertion procedure. Correctly oriented, the major portion of tag housing 34 faces into trough 302. This causes the forward edge 45 of card 44 to be disposed beyond groove 312 when housing 34 is first placed within trough 302 (FIG. 22). Insertion is completed simply by sliding housing 34 further into trough 302, which results in good electrical contact with wire 304 and finger bosses 310.

If tag housing 34 is oriented incorrectly during insertion (FIG. 24), front edge 45 of card 44 will "catch" in groove 312. In addition, the spacing between the edge 303 of trough 302 and the tips 311 of fingers 308 is such that fingers 308 will engage tag housing 34 as shown. The combined effect is to avoid inserting tag housing 34 "upside down" in connector 50'.

Figure 25:
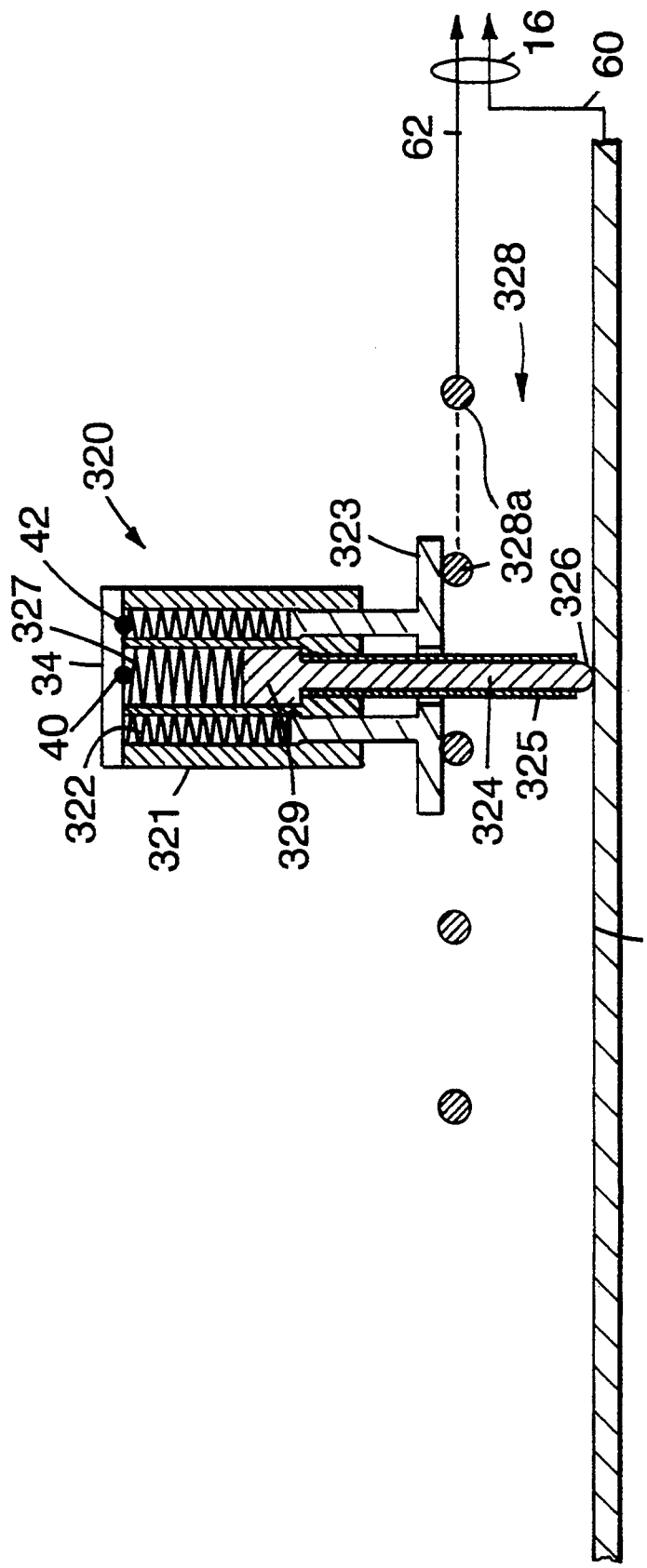

Still other connection techniques are possible. Referring to FIG. 25, a plunger mechanism 300 can be attached to a device 12 (not separately shown) for connecting tag housing 34 to a communication link 16 (and thus memory 32 of tag 30, not shown, across wires 60, 62). Mechanism 320 includes a non-conductive housing 321 that is mounted by a metal spring 322 to an electrically conductive footing 323. Tag housing 34 is secured to the end of housing 321 disposed opposite to footing 323 so that ground port 42 of memory 32 (FIG. 2) is in electrical contact with spring 322 (and thus with footing 323). Housing 321 receives an electrically conductive plunger 324 that extends through an opening in footing 323. An insulating sleeve 325 that surrounds plunger 324 terminates to expose a rounded, electrically conductive plunger tip 326. A metal spring 327 electrically connects plunger 324 to memory data port 40 and urges plunger away from tag 30.

Mechanism 320 is used with a standard wire frame shelf 328 (such as a "Metroshelf" available from Metro Industries of Wilkes-Barre, PA). Shelf 328 includes a set of elongated, spaced metal wires 328a for supporting device 12. Disposed below and spaced from wires 328a is a metal sheet 328b that has substantially the same length and width dimensions as are defined by the set of wires 328a. Data line 60 of a communication link 16 is electrically connected to sheet 328b, and link ground wire 62 is connected to all shelf wires 328a.

In use, when device 12 is placed on shelf 328, spring 327 presses plunger 324 through an opening between adjacent shelf wires 328a so that plunger tip 326 engages sheet 328b, thereby electrically connecting tag memory data port 40 to wire 60 of link 16. An enlarged boss 329 engages a shoulder in housing 321 to retain plunger 324 within housing 321. Footing 323 rests securely on at least one shelf wire 328a, thereby coupling tag memory ground port 42 to link wire 62 (via spring 322). Because plunger 324 is electrically insulated by sleeve 325 except near tip 326, the risk of short-circuiting between footing 323 and plunger 324 is minimal.

Mechanism 320 is mounted to device 12 so that footing 323 is coplanar with the underside of the device. When device 12 is removed from shelf 328 and disposed on a table top or the like, plunger 324 is pressed into housing 321, compressing spring 322. Thus, mechanism 320 is unobtrusive and does not hamper the use of device 12.

Figure 26:
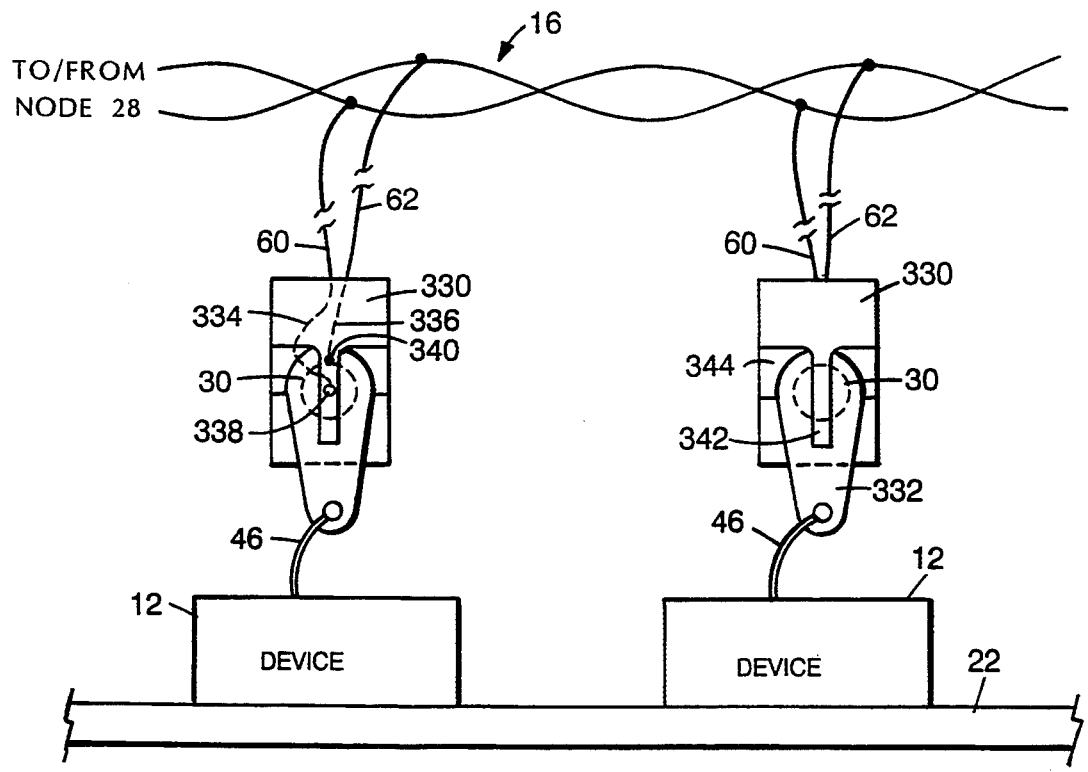

Referring to FIG. 26, in another connection technique, a series of clips 330 are suspended from link 16 above each shelf. Each clip 330 provides a snap fit connection with a tag 30, which is mounted on a tang 332 (a mechanical flange mount available from Dallas Semiconductor as part number DS9093F). Note that tag 30 is disposed opposite the side of tang 332 that is visible in the figure. Clip 330 includes a pair of internal electrical paths 334, 336, which are connected to wires 60, 62 of communication link 16. Paths 334, 336 terminate at contacts 338., 340, which respectively engage tag memory ports 40, 42 (FIG. 2). An elongated finger 342 captures tag 30 against clip housing 344 against contacts 338, 340, one or both of which is configured as a spring to provide the snap fit.

Still other connection techniques are possible. One alternative is to configure connector 50 to secure each tag 30 in place magnetically. In this case, the connector has two electrically conductive plates, one of which includes a series of openings for receiving tag housing 34 and making the connection between ground wire 62 and memory ground port 42. The second plate is spaced behind the first and provides an electrical connection between data wire 60 and memory input port 40 (FIGS. 2 and 3). A layer of magnetic material disposed behind the second plate holds tag housing 34 in place within the opening. This connector is described in 50 Ways to Touch Memory (1992), by Dallas Semiconductor.

Tags 30 can be permanently mounted (rather than tethered) to devices 12. This would eliminate another step in associating each tag 30 with a device 12. This alternating may be combined with, for example, the connection technique shown in FIG. 26 to integrate the step of connecting tag 30 to network 14 with that of placing device 12 on the storage shelf.

Other types of tags 30 may be used. For example, other touch memories (such as other Dallas devices) that have additional memory capacity may be to store data about their associated devices 12. One example is the Dallas DS1992 touch memory, which includes a 1,024 bit scratchpad memory that provides random access storage for such information as device identity (manufacturer and serial number), purchase date, sales vendor, and repair and warranty data. Node 28 (or a data access computer 80 or data management computer 82) updates the information in the scratchpad by sending commands to tag 30 (the command protocol is described in the Dallas book referenced above).

Personnel may record data stored in the memories of tags 30 that are not connected to network 14 using a portable data entry device, such as a "cordless wand" available from Dallas Semiconductor. The wand date and time stamps the data as it is read. The data may then be downloaded into, e.g., a data access computer 80 that is equipped with a suitable user interface.

Figure 27:
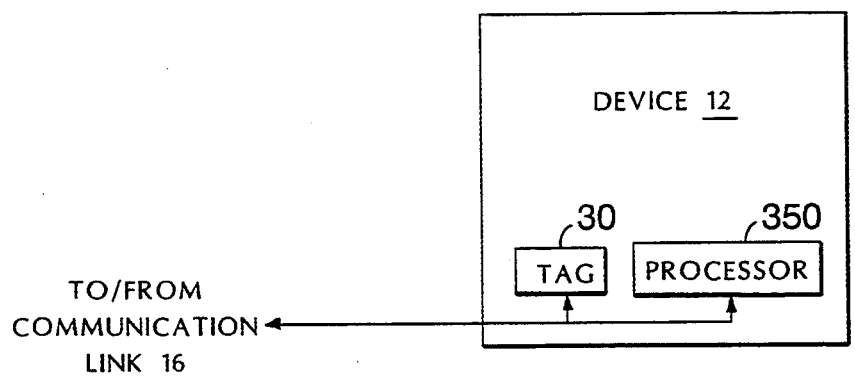
FIG. 27 shows an alternative connection between a tag and a device.

Referring also to FIG. 27, a tag 30 may alternatively be electrically connected to circuitry (such as a processor 350) within device 12. This is particularly useful when tag 30 is equipped with the scratchpad memory discussed above. Among other advantages, this configuration allows processor 350 to download maintenance information (such as run times, errors, etc.) and other information into the memory of tag 30, where it may in turn be obtained by node 20 and/or computers 80, 82.

This discussion has focussed on the use of electronically readable (and writable) data carriers as examples of tag 30. Other suitable types of tags may be used instead. For example, tags 30 may be optically or magnetically readable (and/or writable).

The functions of nodes 28 and computers 80, 82 may be combined in a variety of ways to reduce amount of hardware connected to network 14. For example, a data access computer 80 can include the functionality of one or more nodes 28. Among other advantages, this would allow a single computer to serve as the hub of all communication links 16 assigned to all storerooms and patient rooms of a floor or floors. Moreover, the "nodes" would be directly connected to the Ethernet network. In addition, the functionality of data management computer 82 can be implemented by a data access computer 80 (or shared by multiple data access computers 80).

Nodes 28 can be configured to perform location code ID 142 and condition code ID 144 associations to port IDs 108, and may be connected directly to branches 95 of network 14 (e.g., connected to Ethernet branches). User interface functionality 220 for access to data management computer 82 database reports could be incorporated through data access computers 80 or other computers 118 in, for example, areas of high data access utility. Pager/fax server computer 224 and phone request computer 234 functionalities could all reside in a single computer together with the functionality of data management computer 82 (a user interface 220 may provide access into such a computer, if necessary). Nodes 28 may allow connection of more than four communication links 16 (for example, each node 28 can be connected to as many links 16 as processor 90 can service).

Topologies other than the branched configuration shown in the figures may be used for network 14. For example, network 14 may have a star topology (with, e.g., data management computer 82 arranged at the hub of the star), a multidrop configuration, or a hybrid of any of these topologies. In addition, protocols other than Ethernet (e.g., token ring) may be used to exchange messages over network branches 95.

Communication links 16 and branches 93 can be made from other types of wire, and may have lengths other than the examples described above. Examples of other links include coaxial cable, and fiber optic cable. Moreover, each link 16 need not be physically wired to each location—for example, wireless links 16 can be provided between one or more nodes 28 and the associated connectors 50 in the various locations.

Network branches 95 can use fiber optic cable (or other types of cable). In addition, other communication standards can be used. Examples include 10 Base T and 10 Base 2.

Nodes 28 need not be physically located in the rooms with which they are associated. For example, a node 28 that serves a group of patient rooms 20 may be located in a nearby equipment room. In addition, the RS-485 or RS-422 transmission standards between nodes 28 and data access computers 80 need not be used if, for example, the lengths of branches 93 (FIG. 1) are relatively short (such as less than 100 feet). In this case, standards such as RS-232 may be used. Moreover, multiple communication links 16 may be multiplexed on a single network port 29.

Other device conditions can be monitored by assigning node ports 29 thereto. One example (mentioned above) is the "in use" condition for devices 12 located in patient rooms 20. Another possibility is to define a "reserved" condition for devices 12 that are to be set aside for some predefined use (and are thus unavailable for general use).

The invention is broadly applicable to facilities other than hospitals, and to tracking devices other than portable patient care devices. Any facility (e.g., manufacturing plants, etc.) in which it is desirable to monitor the locations and/or conditions of devices is a candidate for the invention.

What is claimed is:

1. A method of assisting a user in allocating an inventory of a plurality of devices among a plurality of locations, comprising
   providing a network of communication links each of which corresponds to a location of said plurality of locations,
   providing each one of said devices in said inventory with a tag that identifies a said device with respect to other said devices in said inventory, said tag being connectable to a said communication link when said device is disposed at the location to which said communication link corresponds,
   detecting each said tag that is connected to each said communication link,
   generating, based on said detecting, information that indicates the location of each one of said devices in said inventory, and
   providing said information to the user in a manner that enables the user to determine how said devices are allocated among said locations and determine whether some of said devices should be reallocated among said locations.

2. The method of claim 1 wherein each one of at least some of said communication links also correspond to conditions of said plurality of devices, and further comprising
   detecting each said tag that is connected to each one of said some communication links, and
   determining the condition of each said device identified by each said tag based on said detecting.

3. The method of claim 2 further comprising assigning at least two of said some communication links to a single location.

4. The method of claim 2 wherein said conditions include ready for use, in need of cleaning, and in need of repair.

5. The method of claim 1 further comprising providing each said tag with data that includes an address identifying a said device.

6. The method of claim 5 further comprising storing said data that includes said address in a memory of said tag.

7. The method of claim 6 wherein said determining includes reading said data.

8. The method of claim 1 further comprising
allowing at least one of said communication links to have multiple said tags connected thereto,
detecting said multiple tags, and
identifying the devices that are disposed in the location to which said one link corresponds based on said detecting.

9. The method of claim 8 further comprising storing data that includes an address in a memory of each said tag that identifies a said device, said identifying including reading said data.

10. The method of claim 6 or 9 further comprising writing information associated with the device identified by said data into said memory.

11. The method of claim 10 further comprising causing equipment connected to said network to write said information into said memory over the communication link to which said tag is connected.

12. The method of claim 10 further comprising causing said device to write said information into said memory.

13. The method of claim 10 wherein said information includes maintenance information.

14. The method of claim 1 further comprising connecting each said tag to the device identified thereby so that a user can dispose said device near a said link at one of said locations and connect said tag thereto.

15. The method of claim 1 wherein said detecting includes monitoring each one of said links for activity thereon by one or more of said tags.

16. The method of claim 15 wherein said activity includes a connection event in which a user connects a said tag to a said link, and a disconnection event in which a user disconnects a said tag from a said link.

17. The method of claim 16 further comprising performing said monitoring in successive monitoring cycles for each one of said links, and determining that a connection event or a disconnection event is valid only if said connection event or disconnection event is detected in a selected number of successive monitoring cycles.

18. The method of claim 17 further comprising determining that a connection event is valid only if the tag remains connected to said link for a selected amount of time.

19. The method of claim 17 further comprising determining that a disconnection event is valid only if the tag remains disconnected from said link for a selected amount of time.

20. The method of claim 15 further comprising performing said monitoring continuously for each said link.

21. The method of claim 1 wherein the step of providing said network further comprises providing at least one node that performs said detecting for a set of said communication links.

22. The method of claim 21 further comprising assigning at least some of said set of communication links to a single location, and assigning each communication link in said set to a condition of said plurality of devices.

23. The method of claim 22 further comprising
detecting each said tag that is connected to each one of said some communication links in said set, and
determining the condition of each said device identified by each said tag based on said detecting.

24. The method of claim 2 wherein the step of providing information includes storing a database of said information that relates each one of said plurality of devices to the determined said location and condition.

25. The method of claim 24 wherein the step Of providing information further includes generating a report of the locations and conditions of at least some of said devices using said information in said database.

26. The method of claim 25 wherein the step of providing information further includes transmitting said report over a branch of said network for use by equipment that communicate with said network.

27. The method of claim 26 wherein said equipment includes a computer, the step of providing information further including causing said computer to display said report.

28. The method of claim 26 wherein said equipment includes a printer, the step of providing information further including causing said printer to print said report.

29. The method of claim 26 wherein said equipment includes facsimile equipment, the step of providing information further including causing said facsimile machine to transmit a facsimile of said report to a selected destination.

30. The method of claim 26 wherein said equipment includes a computer, the step of providing information further including causing said computer to send a message that contains at least some of the information in said report to a user.

31. The method of claim 30 wherein the step of providing information further includes causing said computer to send said message to a selected pager to page said user.

32. The method of claim 24 wherein the step of providing information includes determining a quantity of said devices of a selected type that are stored in a selected one of said locations using said information in said database.

33. The method of claim 32 wherein the step of providing information includes determining if said quantity differs from a selected quantity and, if so, notifying the user.

34. The method of claim 24 further comprising allowing a user to access said database to obtain said information about the location and condition of a selected one or more of said devices.

35. The method of claim 34 further comprising allowing said user to access said database by telephone.

36. The method of claim 1 further comprising providing at least one of said communication links with a connector configured to allow multiple said tags to be connected thereto.

37. The method of claim 1 further comprising providing at least one of said communication links with a plurality of connectors each of which is configured to allow one of said tags to be connected thereto.

38. A method for locating a plurality of devices, comprising
- providing a network of communication links each of which corresponds to a location among a plurality of locations, at least one of said locations including a shelf having at least one opening therein,
- electrically coupling at least one of said communication links to an electrically conductive member disposed below said opening,
- providing each one of said devices with a tag that identifies a said device with respect to other said devices, said tag being connectable to a said communication link when said device is disposed at the location to which said communication link corresponds,
- providing at least one of said devices with a plunger electrically coupled to said tag,
- resiliently urging said plunger through said opening and into engagement with said electrically conductive member when said at least one of said devices is disposed on said shelf over said opening, thereby to connect said tag to said communication link,
- detecting each said tag that is connected to each said communication link, and
- determining the location of each one of said devices based on said detecting.

39. The method of claim 38 further comprising resiliently retracting said plunger when said at least one of said devices is disposed on a surface that does not include a said opening.

40. The method of claim 38 wherein said at least one communication link includes a pair of wires, and further comprising
- electrically coupling a first one of said wires to said electrically conductive member,
- electrically coupling a second one of said wires to said shelf,
- electrically connecting said tag to said first wire with said plunger, and
- providing said at least one of said devices with an electrically conductive footing that is electrically coupled to said tag and is configured to contact said shelf when said device is disposed thereon to electrically couple said tag to said second wire.

41. Apparatus for assisting a user in allocating an inventory of a plurality of devices among a plurality of locations, comprising
- network of communication links each of which corresponds to a location of said plurality of locations,
- a tag associated with each one of said devices in said inventory that identifies a said device with respect to other said devices in said inventory, said tag being connectable to a said communication link when said device is disposed at the location to which said communication link corresponds,
- means for detecting each said tag that is connected to each said communication link,
- means for generating, based on said detecting, information that indicates the location of each one of said devices in said inventory, and
- means for providing said information to the user in a manner that enables the user to determine how said devices are allocated among said locations and determine whether some of said devices should be reallocated among said locations.

42. The apparatus of claim 41 wherein each one of at least some of said communication links also correspond to conditions of said plurality of devices, and further comprising
- means for detecting each said tag that is connected to each one of said some communication links, and
- means for determining the condition of each said device identified by each said tag based on said detecting.

43. The apparatus of claim 42 wherein at least two of said some communication links are assigned to a single location.

44. The apparatus of claim 42 wherein said conditions include ready for use, in need of cleaning, and in need of repair.

45. The apparatus of claim 41 wherein each said tag includes data that includes an address identifying a said device.

46. The apparatus of claim 45 wherein each said tag includes a memory for storing said data that includes said address.

47. The apparatus of claim 46 wherein said means for determining includes circuitry for reading said data.

48. The apparatus of claim 41 wherein multiple said tags are connected to one of said links, and further comprising
- means for detecting said multiple tags, and
- means for identifying the devices that are disposed in the location to which said one link corresponds based on said detecting.

49. The apparatus of claim 48 wherein data that includes an address is stored in a memory of each said tag that identifies a said device, said means for identifying including means for reading said data.

50. The apparatus of claim 46 or 49 further comprising means for writing information associated with the device identified by said data into said memory.

51. The apparatus of claim 50 wherein said means for writing includes equipment connected to said network, said equipment writing said information into said memory over the communication link to which said tag is connected.

52. The apparatus of claim 50 wherein said device includes said means for writing.

53. The apparatus of claim 50 wherein said information includes maintenance information.

54. The apparatus of claim 41 further comprising a connector for connecting each said tag to the device identified thereby so that a user can dispose said device near a said link at one of said locations and connect said tag thereto.

55. The apparatus of claim 41 wherein said means for detecting includes circuitry for monitoring each one of said links for activity thereon by one or more of said tags.

56. The apparatus of claim 55 wherein said activity includes a connection event in which a user connects a said tag to a said link, and a disconnection event in which a user disconnects a said tag from a said link.

57. The apparatus of claim 56 further comprising
- means for performing said monitoring in successive monitoring cycles for each one of said links, and
- means for determining that a connection event or a disconnection event is valid only if said connection event or disconnection event is detected in a selected number of successive monitoring cycles.

58. The apparatus of claim 57 wherein said means for determining determines that a connection event is valid only if the tag remains connected to said link for a selected amount of time.

59. The apparatus of claim 57 wherein said means for determining determines that a disconnection event is valid only if the tag remains disconnected from said link for a selected amount of time.

60. The apparatus of claim 55 wherein said circuitry is adapted to perform said monitoring continuously for each said link.

61. The apparatus of claim 41 wherein said network further comprises at least one node that includes said means for detecting for a set of said communication links.

62. The apparatus of claim 61 wherein at least some of said set of communication links are assigned to a single location, each communication link in said set being further assigned to a condition of said plurality of devices.

63. The apparatus of claim 62 further comprising
means for detecting each said tag that is connected to each one of said some communication links in said set, and
means for determining the condition of each said device identified by each said tag based on said detecting.

64. The apparatus of claim 42 wherein said means for providing information includes a database for storing information that relates each one of said plurality of devices to the determined said location and condition.

65. The apparatus of claim 64 wherein said means for providing information includes at least one computer for generating a report of the locations and conditions of at least some of said devices using said information in said database.

66. The apparatus of claim 65 further comprising a transmitter for sending said report over a branch of said network for use by equipment that communicate with said network.

67. The apparatus of claim 66 wherein said equipment includes a second computer that includes a display for displaying said report.

68. The apparatus of claim 66 wherein said equipment includes a printer for printing said report.

69. The apparatus of claim 66 wherein said equipment includes facsimile equipment for transmitting a facsimile of said report to a selected destination.

70. The apparatus of claim 66 wherein said equipment includes a second computer for sending a message that contains at least some of the information in said report to a user.

71. The apparatus of claim 70 wherein said second computer includes means for sending said message to a selected pager to page said user.

72. The apparatus of claim 64 wherein said means for providing information includes means for determining a quantity of said devices of a selected type that are stored in a selected one of said locations using said information in said database.

73. The apparatus of claim 72 wherein said means for providing information includes means for determining if said quantity differs from a selected quantity and, if so, notifying the user.

74. The apparatus of claim 64 further comprising means for allowing a user to access said database to obtain said information about the location and condition of a selected one or more of said devices.

75. The apparatus of claim 74 wherein said means for allowing includes a telephone.

76. The apparatus of claim 41 further comprising a connector associated with at least one of said communication links, said connector being configured to allow multiple said tags to be connected thereto.

77. The apparatus of claim 41 further comprising a plurality of connectors associated with at least one of said communication links, each of said connectors being configured to allow one of said tags to be connected thereto.

78. Apparatus for locating a plurality of devices, comprising
network of communication links each of which corresponds to a location among a plurality of locations, at least one of said locations including a shelf having at least one opening therein,
means for electrically coupling at least one of said communication links to an electrically conductive member disposed below said opening,
a tag associated with each one of said devices that identifies a said device with respect to other said devices, said tag being connectable to a said communication link when said device is disposed at the location to which said communication link corresponds,
means for providing at least one of said devices with a plunger electrically coupled to said tag,
means for resiliently urging said plunger through said opening and into engagement with said electrically conductive member when said at least one of said devices is disposed on said shelf over said opening, thereby to connect said tag to said communication link,
means for detecting each said tag that is connected to each said communication link, and
means for determining the location of each one of said devices based on said detecting.

79. The apparatus of claim 78 further comprising means for resiliently retracting said plunger when said at least one of said devices is disposed on a surface that does not include a said opening.

80. The apparatus of claim 78 wherein said at least one communication link includes a pair of wires, and further comprising
means for electrically coupling a first one of said wires to said electrically conductive member,
mean for electrically coupling a second one of said wires to said shelf,
means for electrically connecting said tag to said first wire with said plunger, and
means for providing said at least one of said devices with an electrically conductive footing that is electrically coupled to said tag and is configured to contact said shelf when said device is disposed thereon to electrically couple said tag to said second wire.

81. Apparatus for assisting a user in allocating an inventory of a plurality of devices among a plurality of locations, comprising
means for detecting connections of a plurality of tags to one or more communication links of a network, each one of said tags being associated with one of said devices in said inventory and identifying said one device with respect to other said devices in said inventory,
means for associating each one of said communication links with a location of said plurality of locations, and
means for generating, based on said detecting, information that indicates the location of each one of said devices in said inventory, and means for providing said information to the user in a manner that enables the user to determine how said devices are allocated among said locations and determine whether some of said devices should be reallocated among said locations.

82. The apparatus of claim 81 wherein said means for associating also associates each one of at least some of said communication links to conditions of said plurality of devices, and further comprising
   means for detecting each said tag that is connected to each one of said some communication links, and
   means for determining the condition of each said device identified by each said tag based on said detecting.

83. The apparatus of claim 82 wherein at least two of said some communication links are assigned to a single location.

84. The apparatus of claim 82 wherein said conditions include ready for use, in need of cleaning, and in need of repair.

85. The apparatus of claim 81 wherein each said tag includes data that includes an address that identifies a said device.

86. The apparatus of claim 85 wherein each said tag includes a memory for storing said address.

87. The apparatus of claim 86 wherein said means for determining includes circuitry for reading said data.

88. The apparatus of claim 81 wherein apparatus comprises at least one node on said network, said node including said means for detecting for a set of said communication links.

89. The apparatus of claim 88 wherein said means for associating associates each one of said set of communication links to a single location and associates each communication link in said set to a condition of said plurality of devices.

90. The apparatus of claim 89 further comprising
   means for detecting each said tag that is connected to each communication link in said set, and
   means for determining the condition of each said device identified by each said tag based on said detecting.

91. The apparatus of claim 82 further comprising means for reporting said determined location and condition to a database for storage.

92. The apparatus of claim 90 further comprising at least one computer for generating a report of the locations and conditions of at least some of said devices using said information in said database.

93. The method of claim 1 wherein the step of providing information includes
   storing data that indicates quantities of said devices that should be disposed in said locations,
   determining whether an insufficient quantity of said devices are disposed in a selected one of said locations based on said data and the determined locations of said devices, and
   notifying a user if an insufficient quantity of said devices are determined to be in said selected location.

94. The method of claim 93 further comprising instructing the user to move one or more of said devices to said selected location from another one of said locations if an insufficient quantity of said devices are determined to be in said selected location.

95. The method of claim 1 wherein said devices comprise a plurality of types of devices, the step of providing information including
   storing data that indicates quantities of each said type of said devices that should be disposed in said locations,
   determining whether an insufficient quantity of each said type of said devices are disposed in a selected one of said locations based on said data and the determined location of each one of said devices, and
   notifying a user if an insufficient quantity of said devices of a selected type are determined to be in said selected location.

96. The method of claim 95 further comprising instructing the user to move one or more of said devices of a selected type to said selected location from another one of said locations if an insufficient quantity of said devices of said selected type are determined to be in said selected location.

97. The apparatus of claim 41 wherein said means for providing information includes
   storage for data that indicates quantities of said devices that should be disposed in said locations,
   means for determining whether an insufficient quantity of said devices are disposed in a selected one of said locations based on said data and the determined locations of said devices, and
   means for notifying a user if an insufficient quantity of said devices are determined to be in said selected location.

98. The apparatus of claim 97 further comprising means for instructing the user to move one or more of said devices to said selected location from another one of said locations if an insufficient quantity of said devices are determined to be in said selected location.

99. The apparatus of claim 41 wherein said devices comprise a plurality of types of devices, said means for providing information including
   storage for data that indicates quantities of each said type of said devices that should be disposed in said locations,
   means for determining whether an insufficient quantity of each said type of said devices are disposed in a selected one of said locations based on said data and the determined location of each one of said devices, and
   means for notifying a user if an insufficient quantity of said devices of a selected type are determined to be in said selected location.

100. The apparatus of claim 99 further comprising means for instructing the user to move one or more of said devices of a selected type to said selected location from another one of said locations if an insufficient quantity of said devices of said selected type are determined to be in said selected location.

101. A method for managing a plurality of devices that are capable of being in a plurality of conditions, comprising
   providing a network of communication links each of which corresponds to a location and to one of said conditions,
   providing each one of said devices with a tag that identifies a said device with respect to other said devices, said tag being connectable to a said communication link when said device is disposed at the location to which said communication link corresponds,
   detecting said tags that are connected to said communication links, and determining the location and the condition of each one of said devices by identifying the communication link to which said tag of each one of said devices is connected.

102. Apparatus for managing a plurality of devices that are capable of being in a plurality of conditions, comprising a network of communication links each of which corresponds to a location and to one of said conditions, a tag associated with each one of said devices that identifies a said device with respect to other said devices, said tag being connectable to a said communication link when said device is disposed at the location to which said communication link corresponds, means for detecting said tags that are connected to said communication links, and determining the location and the condition of each one of said devices by identifying the communication link to which said tag associated with each one of said devices is connected.

* * * * *

UNITED STATES PATENT AND TRADEMARK OFFICE
CERTIFICATE OF CORRECTION

PATENT NO.   : 5,434,775

DATED        : July 18, 1995

INVENTOR(S)  : Nathaniel M. Sims, John M. Turner,
               Jane M. Zeisloft, Daniel C. Kusswurm, and
               Ralph H. LaBedz It is certified that error appears in the above-identified patent and that said Letters Patent is hereby corrected as shown below:

On title page, item [56] under "Other Publications",
Column 1, "Dallas Semiconductor....", replace "12-25" with
--12-57--.

Signed and Sealed this

Seventh Day of November, 1995

Attest:

BRUCE LEHMAN

Attesting Officer  Commissioner of Patents and Trademarks